US010006823B2

(12) United States Patent
Gianchandani et al.

(10) Patent No.: US 10,006,823 B2
(45) Date of Patent: Jun. 26, 2018

(54) MICRODISCHARGE-BASED TRANSDUCER

(71) Applicant: The Regents of the University of Michigan, Ann Arbor, MI (US)

(72) Inventors: Yogesh Gianchandani, Ann Arbor, MI (US); Christine Eun, Ann Arbor, MI (US); Xin Luo, Ann Arbor, MI (US); Mark Kushner, Ann Arbor, MI (US); Zhongmin Xiong, Ann Arbor, MI (US); Jun-Chieh Wang, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 62 days.

(21) Appl. No.: 14/899,632

(22) PCT Filed: Jun. 20, 2014

(86) PCT No.: PCT/US2014/043489
§ 371 (c)(1),
(2) Date: Dec. 18, 2015

(87) PCT Pub. No.: WO2014/205395
PCT Pub. Date: Dec. 24, 2014

(65) Prior Publication Data
US 2016/0138991 A1    May 19, 2016

Related U.S. Application Data

(60) Provisional application No. 61/837,514, filed on Jun. 20, 2013.

(51) Int. Cl.
*G01L 9/00*    (2006.01)
*E21B 47/06*    (2012.01)

(52) U.S. Cl.
CPC ............ *G01L 9/0072* (2013.01); *E21B 47/06* (2013.01); *G01L 9/0042* (2013.01); *G01L 9/0051* (2013.01); *G01L 9/0073* (2013.01)

(58) Field of Classification Search
CPC ... G01L 9/0072; G01L 9/0073; G01L 9/0051; G01L 9/0042
See application file for complete search history.

(56) References Cited

U.S. PATENT DOCUMENTS 6,122,973 A * 9/2000 Nomura ................ G01L 9/0075
                                                    361/283.4
8,322,205 B2   12/2012 Silverbrook et al.
(Continued)

FOREIGN PATENT DOCUMENTS

JP    H06109568 A    4/1994
SU    1067377 A1    1/1984
(Continued)

OTHER PUBLICATIONS

International Search Report for application No. PCT/US2014/043489, dated Oct. 16, 2014, 2 pages.

*Primary Examiner* — Paul West
(74) *Attorney, Agent, or Firm* — Kelly Kordzik; Matheson Keys Daffer & Kordzik PLLC

(57) ABSTRACT

The distance between microscale electrodes can be determined from microdischarge current and/or capacitance distribution among a plurality of electrodes. A microdischarge-based pressure sensor includes a reference pair of electrodes on a body of the sensor and a sensing pair of electrodes. One of the electrodes of the sensing pair is on a diaphragm of the sensor so that the distance between the sensing pair of electrodes changes with diaphragm movement, while the distance between the reference pair does not. Plasma and current distribution within a microdischarge chamber of the sensor is sensitive to very small diaphragm deflections.

(Continued)

Pressure sensors can be fabricated smaller than ever before, with useful signals from 50 micron diaphragms spaced only 3 microns from the sensor body. The microdischarge-based sensor is capable of operating in harsh environments and can be fabricated along-side similarly configured capacitive sensors.

15 Claims, 18 Drawing Sheets

(56) References Cited

U.S. PATENT DOCUMENTS

| | | | |
|---|---|---|---|
| 2006/0141786 | A1* | 6/2006 | Boezen ............... B81C 1/00484 438/689 |
| 2011/0128010 | A1* | 6/2011 | Gianchandani ....... G01L 9/0072 324/460 |
| 2013/0050228 | A1* | 2/2013 | Petersen ............... H01L 23/053 345/501 |
| 2013/0145853 | A1 | 6/2013 | Donzier et al. |

FOREIGN PATENT DOCUMENTS

| | | |
|---|---|---|
| WO | 2010/141338 A2 | 12/2010 |
| WO | 2013/083821 A1 | 6/2013 |
| WO | 2013/153224 A1 | 10/2013 |
| WO | 2013/190093 A2 | 12/2013 |

* cited by examiner

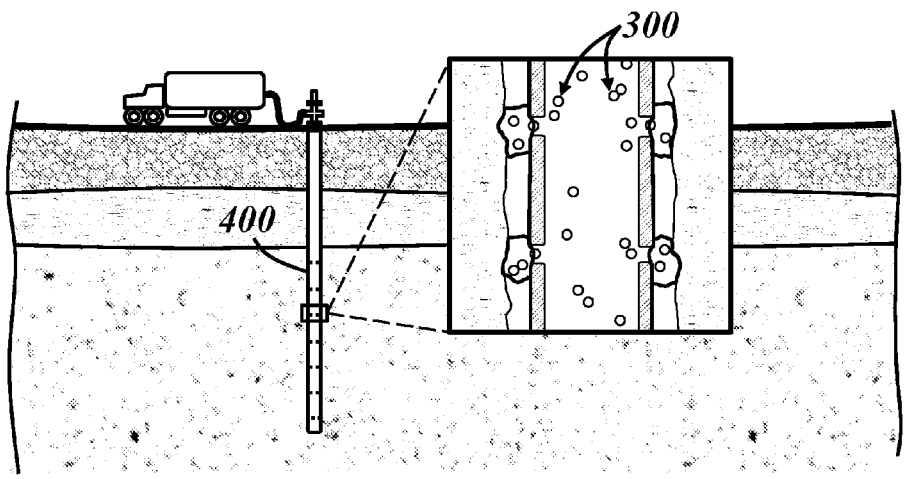
FIG. 30
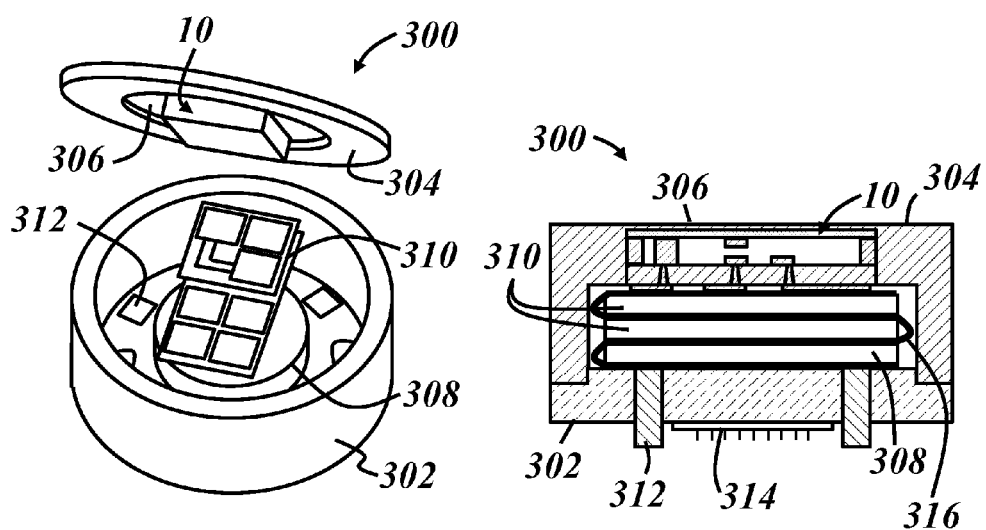
FIG. 31          FIG. 32

MICRODISCHARGE-BASED TRANSDUCER

TECHNICAL FIELD

The present disclosure relates generally to transducers and, in particular, to transducers exhibiting a useful relationship between mechanical displacement and electrical discharge current.

BACKGROUND

A variety of microscale pressure sensing solutions have been explored in the past five decades, of which the most commonly used are piezoresistive and capacitive pressure sensors. Piezoresistive sensors typically measure stress in a diaphragm as it deflects in response to pressure, while capacitive pressure sensors respond to diaphragm deflection rather than stress. Some of the smallest micro-machined pressure sensors that have been reported—e.g., for use within cardiac catheters—use these transduction techniques. For both of these types of sensors, the side-dimensions of the diaphragms of the smallest known devices are about 1 mm. Further reduction in size has been a challenge for both approaches for a variety of reasons.

Piezoresistive sensors have relatively low output impedance, which means that the sensing circuit does not have to be located in the immediate proximity of the sensor. But reducing the diameter of the diaphragm in a piezoresistive sensor presents a challenge in localizing the resistor. For example, if the resistor extends too far from the edge toward the center of the diaphragm, there is a loss of signal due to stress averaging—i.e., the stress along the surface of the diaphragm changes from tensile stress at the perimeter to compressive stress at the center with a null point located therebetween. Making the resistor smaller is a challenge as well. Smaller resistors demand more current to generate a measurable voltage and are relatively imprecise, which affects calibration and yield. Resistors also have an inherently high temperature sensitivity, which makes this transduction approach less appealing for high temperature applications. The equivalent noise pressure from piezoresistive pressure sensors increases as $1/r^4$, where r is the equivalent radius of the diaphragm.

Capacitive pressure sensors present a scaling challenge because capacitance between opposing electrodes decreases in proportion to the electrode area. This scaling puts the burden of detection on the interface circuit. The interface circuit must not only be precise, but must also be located in the immediate vicinity of the sensor in order to prevent the signal—which comes from a high impedance output and is thus inherently weak—from leaking into parasitic capacitance. Another consequence of reduced capacitance is the increase in $k_BT/C$ thermal noise. Together with other noise sources, the equivalent noise pressure from capacitive pressure sensors increases as $1/r$. While capacitive pressure sensors have about $1/10^{th}$ the temperature sensitivity of piezoresistive devices, the proximal interface circuit must be tolerant of high temperature environments as well.

SUMMARY

At least an embodiment of a sensor includes a sensor body, a diaphragm supported in spaced apart relation to the sensor body and facing the sensor body across a gap, and a plurality of electrodes. Each electrode is attached to the sensor body or to the diaphragm at the gap and arranged such that, when the diaphragm deflects relative to the sensor body, the distance between a first pair of the electrodes changes, and the distance between a second pair of the electrodes does not change.

At least an embodiment of the sensor includes a spacer located between the sensor body and the diaphragm. The spacer partly defines a sealed chamber having a perimeter that surrounds the plurality of electrodes.

At least an embodiment of the sensor includes a microdischarge chamber that contains a plasma when an ionizing voltage is applied across the pairs of electrodes.

At least an embodiment of the sensor includes a cathode on the sensor body and a sensing anode on the diaphragm, as the first pair of electrodes, and further includes the cathode and a reference anode on the sensor body, as the second pair of electrodes.

At least an embodiment of the sensor includes an anode on the sensor body and a sensing cathode on the diaphragm, as the first pair of electrodes, and further includes the anode and a reference cathode on the sensor body, as the second pair of electrodes.

At least an embodiment of the sensor includes electrical contacts accessible at an exterior of the sensor and through-glass vias (TGVs) electrically connecting the electrical contacts with the plurality of electrodes through the thickness of the sensor body.

At least an embodiment of the sensor includes electrical contacts accessible at an exterior of the sensor. The sensor body comprises a doped semi-conductor layer electrically connecting the electrical contacts with the plurality of electrodes through the thickness of the sensor body.

At least an embodiment of the sensor is configured to be capable of operation in a microdischarge mode and in a capacitive mode.

At least an embodiment of the sensor includes a cathode and an anode on the sensor body as the second pair of electrodes. The cathode has a plasma-concentrating feature that extends toward a plasma-concentrating feature of the anode to define a minimum gap between opposing edges of the cathode and anode.

At least an embodiment of a method of determining fluid pressure in a subterranean cavity includes the step of receiving information related to the amount of deflection of a diaphragm of a sensor immersed in a fluid located in the subterranean cavity. The sensor includes a plurality of electrodes arranged in a sealed chamber such that the distance between a first pair of the electrodes changes more than the distance between a second pair of the electrodes when the amount of deflection of the diaphragm changes. The received information indicates the distribution of an electrical property among the plurality of electrodes in response to a voltage applied to the plurality of electrodes.

At least an embodiment of the method is performed with a microdischarge-based sensor as the sensor. The received information includes differential current, defined as the ratio of: the difference in the current flow between the two pairs of electrodes, to the sum of the current flow between the two pairs of electrodes.

At least an embodiment of the method is performed with a capacitive sensor as the sensor. The received information is based on a comparison of the capacitance between the first pair of electrodes and the capacitance between the second pair of electrodes.

At least an embodiment of the method is performed such that the step of receiving information includes receiving information related to the amount of deflection of each of a plurality of diaphragms of a corresponding plurality of sensors immersed in the fluid and dispersed in the subterranean cavity. Each sensor includes a plurality of electrodes arranged in a sealed chamber such that the distance between a first pair of electrodes of each sensor changes more than the distance between a second pair of electrodes of each sensor when the amount of deflection of each diaphragm changes. The received information indicates the distribution of an electrical property among the plurality of electrodes of each sensor in response to a voltage applied to the plurality of electrodes of each sensor.

BRIEF DESCRIPTION OF THE DRAWINGS

Illustrative embodiments will hereinafter be described in conjunction with the appended drawings, wherein like designations denote like elements, and wherein:

FIG. 30 illustrates a system and process for implementing embodiments of the sensor in a subterranean environment;

FIG. 31 is a perspective view of an embodiment of the sensor as part of a sensor package; and FIG. 32 is a cross-sectional view of an embodiment of the sensor as part of another sensor package.

DETAILED DESCRIPTION

Figure 1A:
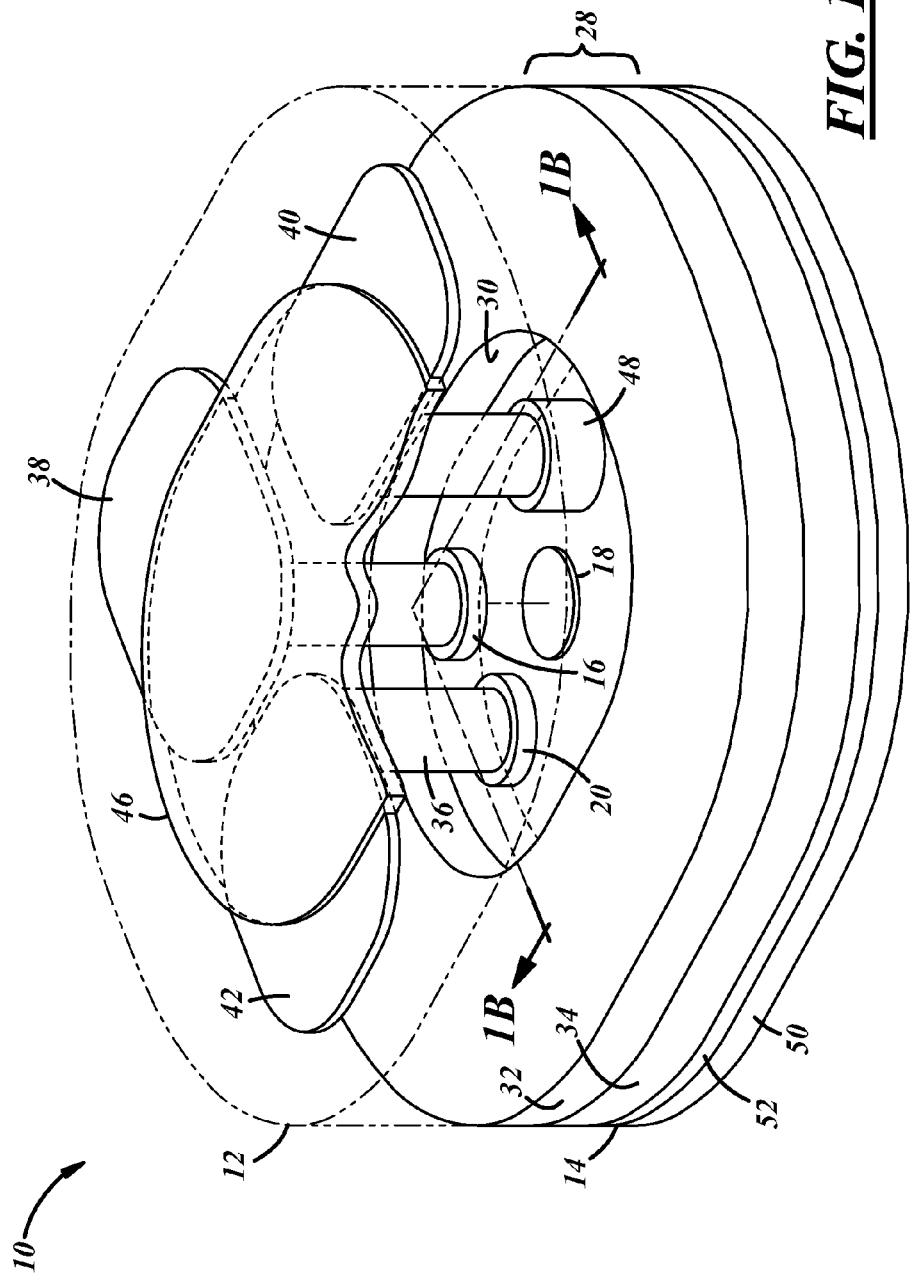
FIG. 1A is a perspective view of an embodiment of a microdischarge-based sensor with the sensor body shown in phantom.

Embodiments of the sensor described herein incorporate a plurality of electrodes, among which certain electrical characteristics can be measured and compared. The comparisons are indicative of the relative positions of the electrodes so that, when at least one of the electrodes moves with a sensor component such as a diaphragm, the measured electrical characteristics among the plurality of sensors changes. In an embodiment, the sensor is a microdischarge-based sensor that provides an output signal indicative of the spatial current distribution of a confined plasma as it relates to the amount of deflection of a sensor diaphragm in response to a pressure differential. Microdischarges are localized glow discharge plasmas or arcs created in a gaseous medium, which, due to their size, have characteristics different from larger scale discharges. Microdischarges can be used in a variety of microsensors, including micro total analysis systems that use optical emission spectroscopy for chemical sensing, radiation detectors, or sputter ion pumps, to name a few examples.

Devices incorporating microdischarges are well-suited for high temperature operation, as electron temperatures are typically many eV (1 eV=11,600 K) and thus are not significantly perturbed by a high ambient temperature. For the conditions encountered in these devices, ions have temperatures moderately above ambient temperature with transport coefficients that are also not particularly sensitive to high operating temperatures. Since the plasma is partially ionized, the high temperatures of the electrons and ions represent a small fraction of the total energy content. The high temperatures of the electrically conducting species make microdischarge-based devices relatively insensitive to many harsh environments, such as those encountered in oil exploration and production, for example. Microdischarge-based transducers may also exhibit signal levels that are relatively large compared to both capacitive and piezoresistive devices, potentially eliminating the need for a proximal interface circuit and/or substantially reducing the need for signal amplification. These characteristics facilitate transducer miniaturization.

Described below is a microdischarge-based approach for determining diaphragm deflection in a sensor. Electrodes or electrode portions exposed to the interior volume of a microdischarge chamber are arranged along a sensor body and a diaphragm so that diaphragm movement changes the interelectrode spacing, thereby affecting the distribution of the total discharge current within the chamber among the electrodes, such as between a reference pair of electrodes and a sensing pair of electrodes. Differential current among the electrodes is indicative of the amount of diaphragm deflection, which, in the context of a pressure sensor, is caused by a pressure differential between the chamber and an external pressure outside the chamber. A microfabricated pressure sensor is described for illustrative purposes, but this approach may be used in other types of sensors or to determine the distance or the change in distance between two bodies that move relative to each another on a microscale. The sensor described below can also readily function as a capacitive sensor, thus providing a dual-mode sensor suitable for a wide variety of applications.

According to the techniques presented below, a sensing device can be constructed with a total exterior volume of only 0.05 mm$^3$ or less. Sensors have been successfully constructed with a total exterior volume as small as 0.002 mm$^3$. In an example, a 6-mask microfabrication process is described for device fabrication. Similar fabrication processes can be used for microdischarge-based sensors, capacitive sensors, and dual-mode sensors. Capacitive sensors have been successfully constructed with a total exterior volume as small as 0.0045 mm$^3$. The redistribution of plasma current among competing electrodes due to diaphragm deflection over a range of pressures is demonstrated experimentally below. First principles modeling of transient microdischarges provides insight to the fundamental processes responsible for the differential current and guidance for scaling the device to smaller dimensions.

Figure 1B:
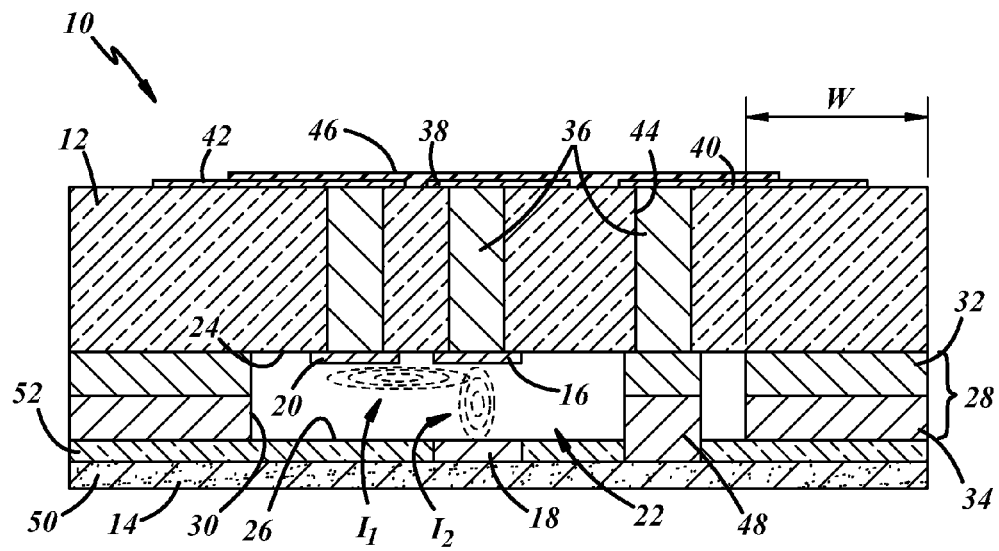
FIG. 1B is a cross-sectional view of the sensor of FIG. 1A.

An example of a microdischarge-based transducer is illustrated in FIGS. 1A and 1B in the form of a pressure sensor 10. FIG. 1A is a perspective view of the sensor 10, and FIG. 1B is a cross-sectional view of FIG. 1A. The illustrated sensor 10 includes a sensor body 12, a diaphragm 14, and a plurality of electrodes 16, 18, 20. The sensor body 12 is shown in phantom in FIG. 1A to better illustrate other sensor components. The diaphragm 14 is supported in spaced apart relation to the body 12. First, second, and third electrodes 16, 18, 20 are arranged between the body 12 and the diaphragm 14 such that, when the diaphragm is deflected relative to the body, the distance between the first and second electrodes 16, 18 changes more than the distance between the first and third electrodes 16, 20. The sensor 10 also includes a microdischarge chamber 22 located between the sensor body 12 and the diaphragm 14, with the first electrode 16 located along a body side 24 of the chamber and the second electrode located along a diaphragm side 26 of the chamber (FIG. 1B). In this example, the third electrode 20 is located along the body side 24 of the chamber, but other arrangements are possible. Thus, when the diaphragm 14 deflects toward the sensor body 12, such as when acted on by an external pressure, the first and second electrodes 16, 18 move closer together, while the distance between the first and third electrodes 16, 20 does not change.

In some embodiments, the first electrode 16 is an anode, and the second and third electrodes 18, 20 are competing cathodes. In other embodiments, the first electrode 16 is a cathode, and the second and third electrodes 18, 20 are competing anodes. The second electrode 18 may be referred to as a sensing electrode, as its distance from the first electrode 16 changes by an amount of interest. The third electrode 20 may be referred to a reference electrode, as its distance from the first electrode 16 changes by a known amount, which in this example is essentially zero. The first and second electrodes 16, 18 may be referred to as a sensing pair of electrodes, and the first and third electrodes 16, 20 may be referred to as a reference pair of electrodes. When a sufficient voltage or voltage pulse is applied across each of the pairs of electrodes, a corresponding discharge current can be measured between each of the pairs of electrodes. Pulsed microdischarges may be preferred in some cases to limit power consumption and parasitic heating (compared to non-pulsed), but customized code is required for simulating and modeling pulsed discharges.

A reference discharge current $I_1$ can be measured between the electrodes 16, 20 of the reference pair, and a sensing discharge current $I_2$ can be measured between the electrodes 16, 18 of the sensing pair. The two currents $I_1$, $I_2$ can be compared to determine the distance between the sensing pair of electrodes 16, 18. In one manner of comparison, the fraction of the total peak current contributed by the sensing pair of electrodes 16, 18 may be determined and used as a sensor output. This fraction is referred to as the differential current and is given by:

$$\frac{I_1 - I_2}{I_1 + I_2},$$

where $I_1+I_2$ is the total peak current. This quantity is a function of the amount of diaphragm deflection. With differential current as the sensor output, the absolute current is less important, thus helping minimize the effect of pulse-to-pulse variation in microdischarge characteristics.

The electrodes 16, 18, 20 may be formed from any electrically conductive material. In an embodiment, the electrodes 16, 18, 20 are formed from nickel (Ni) or from a Ni-alloy. Ni-based materials may be selected for their high secondary electron emission coefficient (contributing to lower operation voltage), high resistance to oxidation, compatibility with thin film deposition or electroplating processes, and ease of patterning. Other suitable materials may be used.

The illustrated sensor 10 includes a spacer 28 located between the sensor body 12 and the diaphragm 14 that at least partially defines a perimeter 30 of the microdischarge chamber 22. The spacer 28 may be provided to support the diaphragm 14 in spaced apart relation to the sensor body 12. In this example, the spacer 28 is a eutectic bond ring that circumscribes the microdischarge chamber 22 and bonds the diaphragm 14 and the body 12 together. The illustrated bond ring 28 is configured to form a eutectic bond between the body 12 and the diaphragm. For purposes of illustration, the eutectic bond ring 28 is shown before the eutectic alloy of the bond ring is formed and initially includes discrete layers of materials 32, 34. In one example, one of the layers 32 is indium (In), and the other of the layers 34 is gold (Au). The eutectic bond ring partly defines the sealed chamber 22 and, in an embodiment, is 200 μm in width (W).

The size of the microdischarge chamber 22 may vary and, in an embodiment, is about 185 μm in length and 140 μm in width with the spacer 28 defining the height of the microdischarge chamber 22 and, consequently, the interelectrode spacing for the sensing pair of electrodes 16, 18. The spacer 28 in the example of FIGS. 1A and 1B allows each of the body 12 and the diaphragm 14 to be formed as simple layers without the need to etch or otherwise hollow out an area between the body and diaphragm to form the chamber 22. Electrostatic finite element analysis (FEA) using COMSOL Multiphysics® software (available from COMSOL, Inc., www.comsol.com) has confirmed that a conductive spacer has little or no effect on the electric field profile in the chamber 22.

The sensor 10 may also include one or more conductive vias 36 extending through the sensor body 12. In this example, the sensor 10 has three such vias 36—one associated with each of the electrodes 16, 18, 20. Each of the vias 36 is configured to provide an electrically conductive path between the microdischarge chamber 22 and a location outside the chamber and/or at a location accessible at the exterior of the sensor 10. In this example, the vias 36 electrically connect electrodes 16, 18, 20 to respective contact pads or contacts 38, 40, 42 at an exterior side of the sensor body opposite a chamber side of the body. A layer 46 of electrically-insulating material, such as epoxy or other suitable material, may be provided to partially cover the contacts 38, 40, 42 as shown. Here, the insulating material 46 is centrally located such that the spacing between the accessible (i.e., uncovered) portions of the contacts 38, 40, 42 is generally maximized.

In an embodiment, the vias 36 are formed by electroplating internal surfaces of the body 12 surrounding holes 44 formed through the body 12. Copper (Cu) or some other electrically conductive material may be used as the electroplating material. The electrically conductive material may be deposited in the holes 44 in such a manner as to completely fill the holes, forming solid conductors through the sensor body 12, as shown. In an embodiment, each via 36 comprises a conductive material that hermetically seals a hole 44 formed through the body 12. Among other benefits, this can help prevent any fill gas in the chamber 22 from escaping. Where the sensor body 12 is glass, the vias 36 may be referred to as through-glass vias (TGVs).

A portion of the electrical connection between the sensing electrode 18 and the corresponding external contact 40 is formed by a connector 48 extending between the body side 24 and the diaphragm side 26 of the chamber 22. In this example, the connector 48 is initially formed by the same layers 32, 34 of materials as the spacer 28 and is thus formed as a eutectic alloy, but it may be otherwise formed. In the illustrated example, the diaphragm 14 includes multiple layers, including a conductive or semi-conductive layer 50 and an insulating layer 52. Layer 50 may be a doped-Si layer, and layer 52 may be a layer of silicon dioxide (SiO$_2$), for example. The electrical path from the sensing electrode 18 to the contact 40 thus extends from the electrode 18, along a portion of layer 50 to the connector 48, through the insulating layer 52 of the diaphragm 14, along the connector 48 and one of the vias 36 to the contact 40. The insulating layer 52 in this example isolates the conducting layer 50, and thus the sensing electrode 18 and the connector 48, from the spacer 28. A silicon diaphragm 14 enables relatively large diaphragm deflection within the fracture limit, as well as sufficient electrical conductivity when doped. Other materials may be suitable for the diaphragm 14.

While the illustrative sensor construction of FIGS. 1A and 1B is described primarily with respect to microdischarge-based operation, it is also capable of functioning as a capacitive sensor. For example, capacitance may be measured between the sensing electrode 18 and one or both of the other electrodes 16, 20 for correlation with diaphragm deflection. Inclusion of three or more electrodes offers the advantage of comparing the measured capacitance between different pairs of electrodes and defining relationships among the different capacitance measurements (e.g., a differential capacitance) that may provide enhanced sensitivity or signal strength over known capacitive sensors. In an embodiment, the sensor 10 is a dual-mode sensor capable of operation in a microdischarge mode and in a capacitive mode. In the capacitive mode, one pair of the electrodes (e.g., the pair of electrodes 16, 20 located on the sensor body) may be electrically shunted together to provide one larger capacitance measurement between the shunted pair and the sensing electrode 18, or one of the electrodes 16, 20 may not be used at all.

A microdischarge sensor has been modeled and constructed according to FIG. 1A with the first electrode 16 configured as an anode and the sensing and reference electrodes 18, 20 configured as competing cathodes. The targeted external dimensions of the sensor were 585 μm×540 μm×200 μm, or 0.063 mm$^3$. The associated microdischarge chamber 22 has a volume of only about 2.2×10$^{-4}$ mm$^3$. A glass wafer served as the sensor body 12 and provides adequate electrical isolation between the TGVs 36 during device operation. This isolation accommodates operating voltages that are 100-500 V, or even higher, making the sensor suitable for use in the microdischarge regime. Embodiments of the sensor incorporating this electrode configuration may have external dimensions defining a sensor volume in a range from 0.01 mm$^3$ to 0.1 mm$^3$ enabling sensor volumes less than 0.05 mm$^3$, which is smaller than known pressure sensors. These small sensor sizes are enabled in part by the high sensitivity of microdischarge current to electrode spacing in a measurable range.

Figure 2:
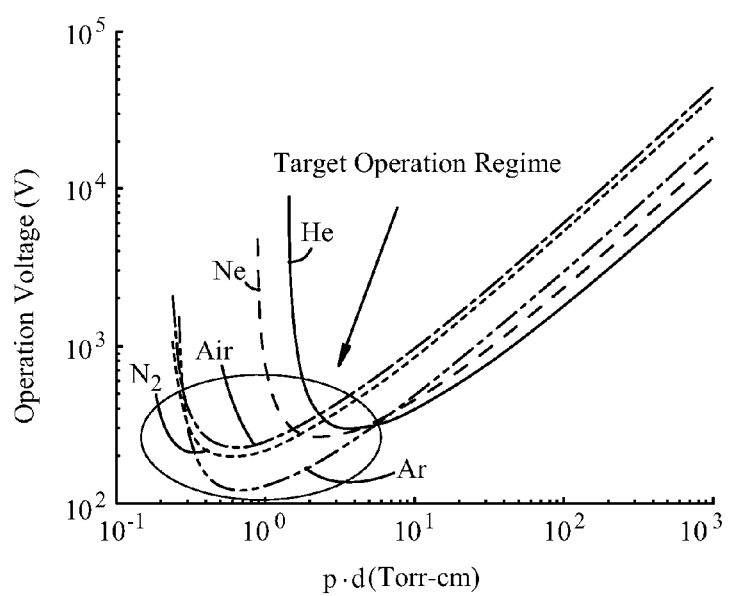
FIG. 2 is a chart showing Paschen curves for various fill gases, illustrating the relationship between operating voltage and p·d product, where p is pressure and d is interelectrode spacing.

The interelectrode spacing and the thickness of the diaphragm 14 are two variables that affect sensor operation. For example, the interelectrode spacing, together with the fill gas and interior pressure of the chamber 22, determines the discharge initiation voltage. The breakdown voltage between plane-parallel electrodes is given by the Paschen curve for a particular fill gas and chamber pressure. FIG. 2 shows Paschen curves for various fill gases with nickel electrodes, illustrating the relationship between operating voltage and p·d product, where p is the pressure and d is the interelectrode spacing. Breakdown voltage $V_b$ is expressed as:

$$V_b = \frac{Bpd}{\ln Apd - \ln[\ln(1 + 1/\gamma_{se})]}, \qquad (1)$$

where p is the fill gas pressure and d is the effective length of the breakdown path, approximated by the spacing between the electrodes. A ($cm^{-1}$ $Torr^{-1}$) and B ($Vcm^{-1}$ $Torr^{-1}$) are parameters obtained by fitting the first Townsend coefficient, $\alpha$ ($cm^{-1}$) as a function of E/p (Electric field/gas pressure), where $\alpha = Ap \cdot \exp(-(E/p)/Bp)$. A and B depend on the type of gas, but not on the electrode material. The parameter $\gamma_{se}$ is the secondary electron emission coefficient by ion bombardment, which depends on the material selected for the electrodes and on the fill gas. A larger $\gamma_{se}$ lowers the breakdown voltage—another reason Ni-based materials are useful electrode materials. For any given fill-gas in the microdischarge chamber, there is a p·d product that corresponds to a minimum voltage for discharge initiation.

Operating the sensor near the minimum in the Paschen curve offers the additional benefit that the energy dissipated by the discharge is reduced. To determine chamber dimensions and interelectrode spacing for modeling the sensor according to FIGS. 1A and 1B, the fill gas is argon (Ar) at a pressure of 1 atm. Argon is cost-effective and offers lower operating voltages than some other gases, such as nitrogen. For the examples presented below incorporating an anode and competing cathodes, the thickness of the spacer is set at 10 µm and 30 µm in the plasma model and at 30 µm in the experiments.

Figure 3:
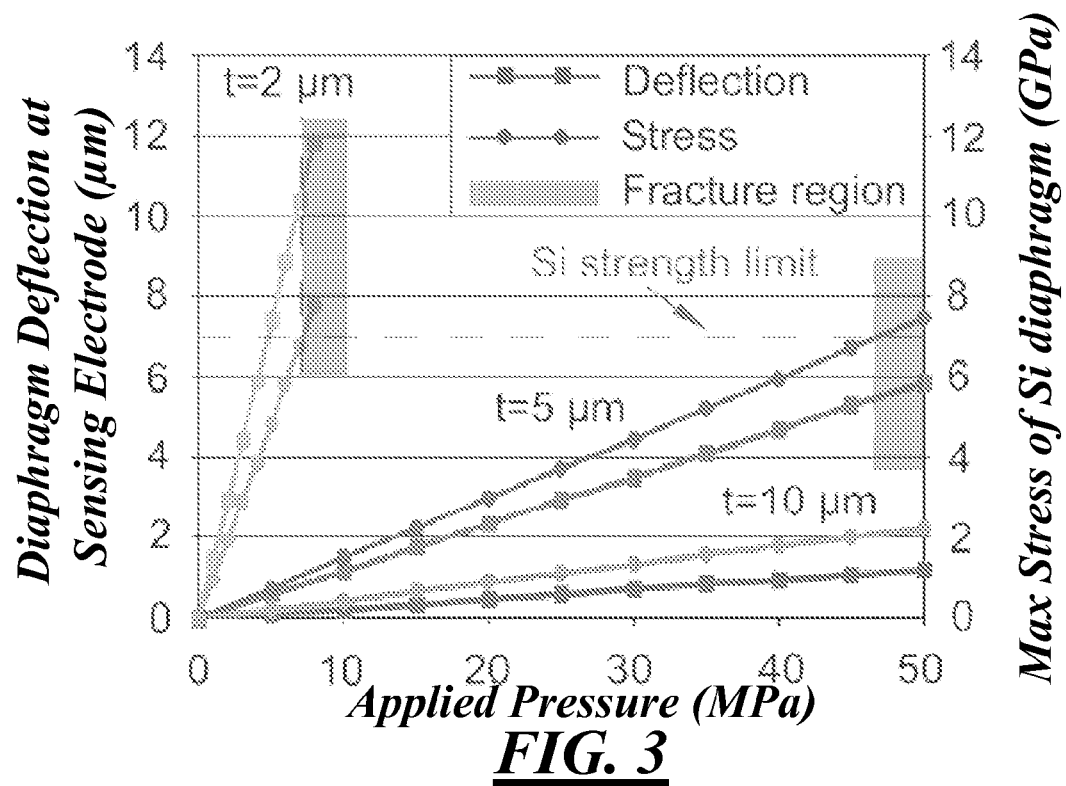
FIG. 3 is a chart showing FEA simulations of diaphragm deflection and maximum stress for diaphragms with 2 μm, 5 μm and 10 μm thicknesses.

The thickness of the diaphragm affects both the sensitivity and the dynamic range of the sensor. In particular, a thinner diaphragm results in higher sensitivity but limits the measurable pressure. A finite element analysis was performed COMSOL Multiphysics® software (available from COMSOL, Inc., www.comsol.com) to help determine the appropriate diaphragm thickness. FIG. 3 shows simulation results of diaphragm deflection at the sensing electrode and maximum stress for Si diaphragms with thicknesses (t) of 2 µm, 5 µm and 10 m. The simulation indicates that a 5 µm thick diaphragm supports a large dynamic pressure range while allowing significant deflection.

According to the simulation, a diaphragm with a thickness of 5 m can deflect up to about 5 µm (0.12 µm/MPa) while remaining below the fracture limit, which is a significant fraction of the initial electrode spacing. For a nominal electrode gap of 10 µm, a diaphragm deflection of 5 µm is predicted to change the pressure in the microdischarge chamber from 1 atm to about 1.2 atm. This is according to the following formulae, assuming that the ideal gas law is applicable:

$$\Delta d = \frac{3 \cdot \Delta P(1-v^2)a^4}{16Eh^3} \quad (2)$$

and $$\Delta V = \frac{\pi \cdot a^2 \cdot \Delta d}{3}, \quad (3)$$

where $\Delta d$ is the deflection at the center of a circular diaphragm, $\Delta P$ is the pressure difference across the diaphragm, a is the radius, h is the thickness, v is Poisson's ratio of the material, E is Young's modulus and $\Delta V$ is the volume change due to deflection.

Microdischarge Modeling

First principles computer modeling of the microdischarge pressure sensor was performed to provide insight to the physical processes occurring in such devices and to provide guidance in scaling the devices to smaller dimensions. The 2-dimensional computational platform used for these modeling studies is nonPDPSIM, (available by license from the Michigan Institute for Plasma Science & Engineering (MIPSE) at the University of Michigan, Ann Arbor), which solves transport equations for all charged and neutral species in the plasma coincident with Poisson's equation for the electric potential and radiation transport. The fundamental equations for charged species are:

$$\nabla(\varepsilon \nabla \Phi) = -\left(\sum_j q_j N_j + \rho_s\right) \quad (4)$$

$$\frac{\partial N_j}{\partial t} = -\nabla \cdot \vec{\Gamma}_j + S_j \quad (5)$$

$$\frac{\partial \rho_s}{\partial t} = \left[\sum_j q_j(-\nabla \vec{\Gamma}_j + S_j) - \nabla(\sigma(-\nabla \Phi))\right], \quad (6)$$

where $\varepsilon$, $\Phi$, $\rho_s$ and $\sigma$ are the permittivity, electric potential, surface charge and conductivity of solid materials; and for species j, $N_j$, $\Gamma_j$, $S_j$ and $q_j$ are density, flux, source function and charge, respectively. Equation 4 is Poisson's equation, equation 5 is a transport equation for conservation of the charged species j, and equation 6 is a material and surface charge balance equation. Equations 4-6 are simultaneously integrated using a sparse-matrix and Newton iteration technique. Equations 5-6 are solved throughout the computational domain to address electric field penetration into dielectrics. Electrically floating metal materials are approximated as dielectrics having sufficiently high conductivities that there is essentially no internal electric field. The electron energy equation is integrated for average energy $\varepsilon$:

$$\frac{\partial(n_e \varepsilon)}{\partial t} = \vec{j} \cdot \vec{E} - \nabla \cdot \left(\frac{5}{2}\Gamma_e \varepsilon - \lambda \nabla T_e\right) - n_e \sum_i \Delta \varepsilon_i \kappa_i N_i, \quad (7)$$

where $T_e$ is the electron temperature defined as $(2\varepsilon/3)$, $n_e$ is the electron density, $\kappa_i$ is the rate coefficient for collision process i with species having density $N_i$ and energy loss $\Delta \varepsilon_i$, $\lambda$ is the electron thermal conductivity, and $\Gamma_e$ is the electron flux. Transport and rate coefficients are obtained by solving Boltzmann's equation for the electron energy distribution, and constructing a table of coefficients as a function of $T_e$. This table is then interpolated and updated during execution of the model. These electrons are referred to as bulk electrons. Secondary electrons emitted from surfaces and accelerated in the sheaths adjacent to surfaces are referred to as beam electrons. These electrons are tracked using a Monte Carlo simulation. Secondary electrons are emitted from surfaces by bombardment by fluxes of ions and UV photons.

The computational platform, nonPDPSIM, uses an unstructured mesh which enables fine features of the actual devices to be modeled over a dynamic range of $10^4$, and so an assessment of narrowly spaced elements and small features can be made. The finest resolution of the mesh for cases discussed here was 0.6-0.8 µm. Although the mesh is static—that is, it does not evolve during the calculation—the change in differential current as a function of pressure can be modeled with a series of calculations, each with a different deformation of the diaphragm. Extensive databases are available for plasma and neutral reactions occurring in an argon gas atmosphere.

Figure 4:
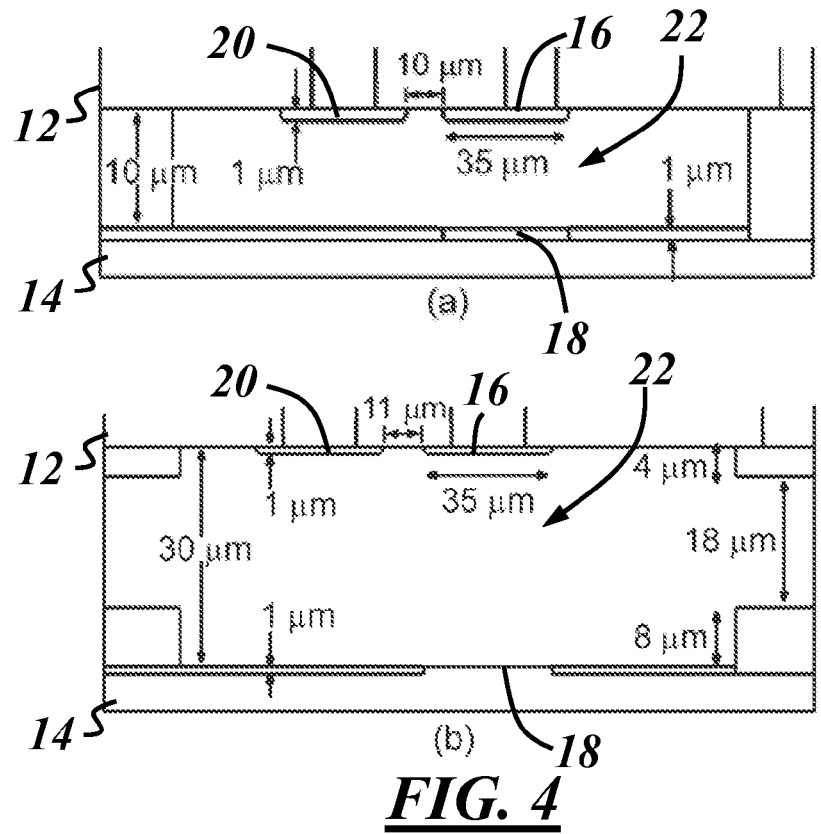
FIG. 4 includes schematic views of a microdischarge chamber with a 10 μm gap (a), and a microdischarge chamber with a 30 μm gap (b)

FIG. 4 schematically illustrates two geometries of the microdischarge-based pressure sensor that were modeled.

The microdischarge chamber 22 is shown in FIG. 4(a) for a sensor having a 10 μm gap or chamber height. The vertical scale is expanded for clarity. The sensor body 12 is glass with a dielectric constant of $\in/\in_0=3.9$. The anode 16 and the reference cathode 20 are exposed to the microdischarge chamber 22 and have a thickness of 1 μm, a width of 35 μm, and are separated by 10 μm along the body side of the chamber. The exposed area of the sensing cathode 18 is directly aligned with the anode 16 and covered with dielectric elsewhere. FIG. 4(b) shows the sensor body 12 and diaphragm 14 with a 30 μm chamber height, as configured for experimental validation with a working model.

Figure 5:
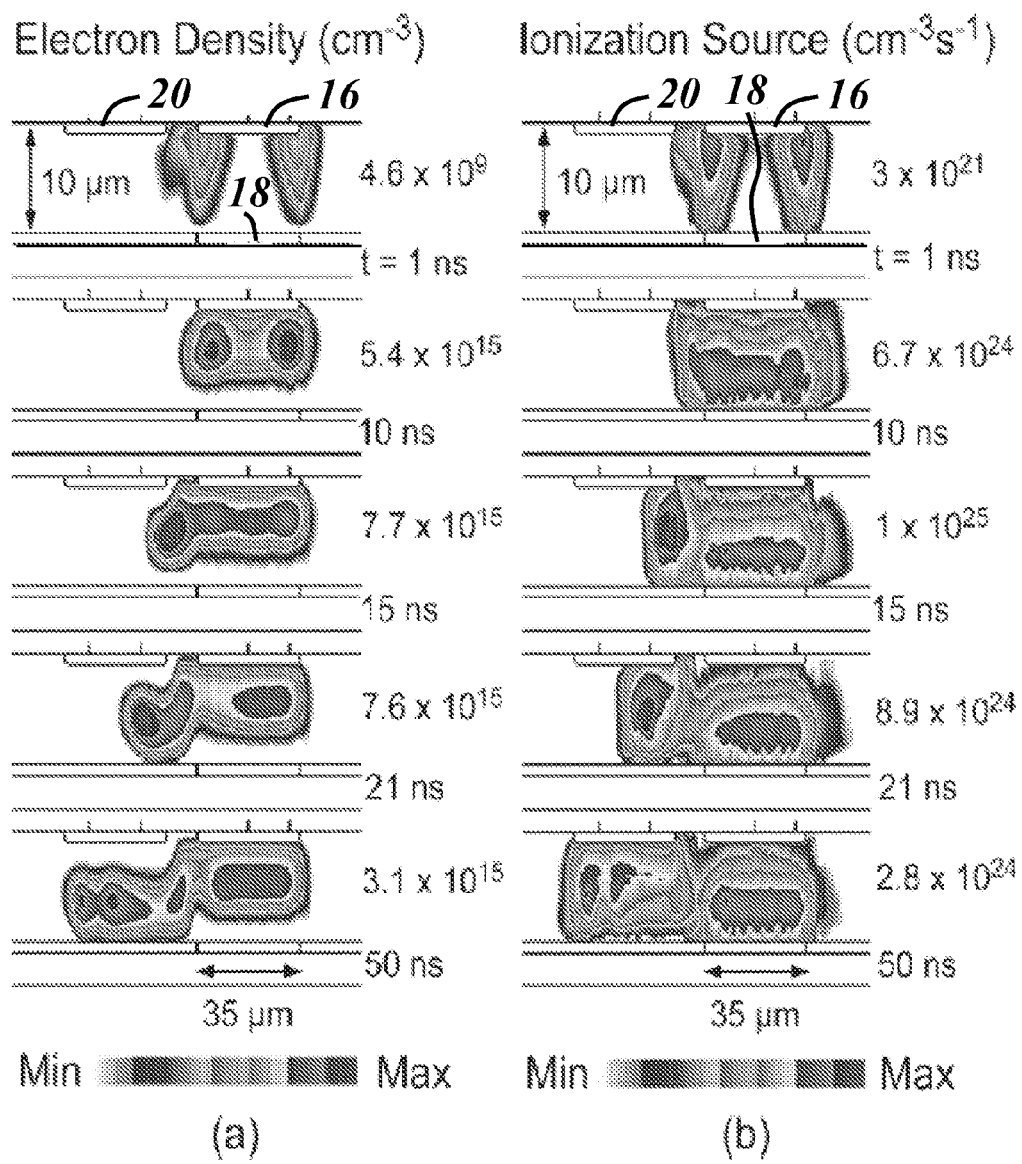
FIG. 5 are contour plots of simulated electron density (a) and ionization source (b) by bulk and secondary beam electrons for the sensor of FIG. 4(a) at various times after 400 V is applied at the anode at 1 atm in argon (maximum values are given to the right of each plot)

FIG. 5 illustrates the simulated electron density (a) and ionization source (b) by bulk and secondary beam electrons for the device of FIG. 4(a). The ionization source is the volumetric rate at which electrons and ions are produced by collisions between electrons and atoms. The fill gas is Ar at 1 atm (760 Torr). For this simulation, the applied voltage on the anode 16 is 400 V, and the sensing and reference cathodes 18, 20 are grounded. Ballast resistors of 100 Ω, 100Ω and 500Ω are assumed in series with the reference cathode 20, the sensing cathode 18, and the anode 16, respectively. The plasma is initiated by a small amount of electric field emission of electrons from the edges of the cathodes 18, 20, resulting in a negligibly small current density of $10^{-2}$ A-cm$^{-2}$. These electrons rapidly avalanche in the geometrically enhanced electric fields at the edges of the anode 16. The electron density increases from $10^9$ to nearly $10^{16}$ cm$^{-3}$ over a period of 10 ns, creating a conductive plasma in front of the anode 16. This conductive plasma then reduces the electric field around the anode 16, translating the large electric field to the periphery of the plasma and toward the cathodes 18, 20. When the plasma reaches the sensing cathode 18, ion and photon bombardment of its surface produces secondary electrons which are accelerated back into the plasma and maintain a large rate of ionization. The large electric field directed toward the reference cathode 20 enables the plasma to spread in that direction, eventually covering the reference cathode after about 20 ns. Bulk electrons are prevented from reaching the cathodes 18, 20 by the large negative potential of each electrode with respect to the plasma, as shown by the gaps in bulk electron density adjacent to each cathode in FIG. 5(a). Current to these electrodes is provided by the conduction current of ions and displacement current.

Figure 6:
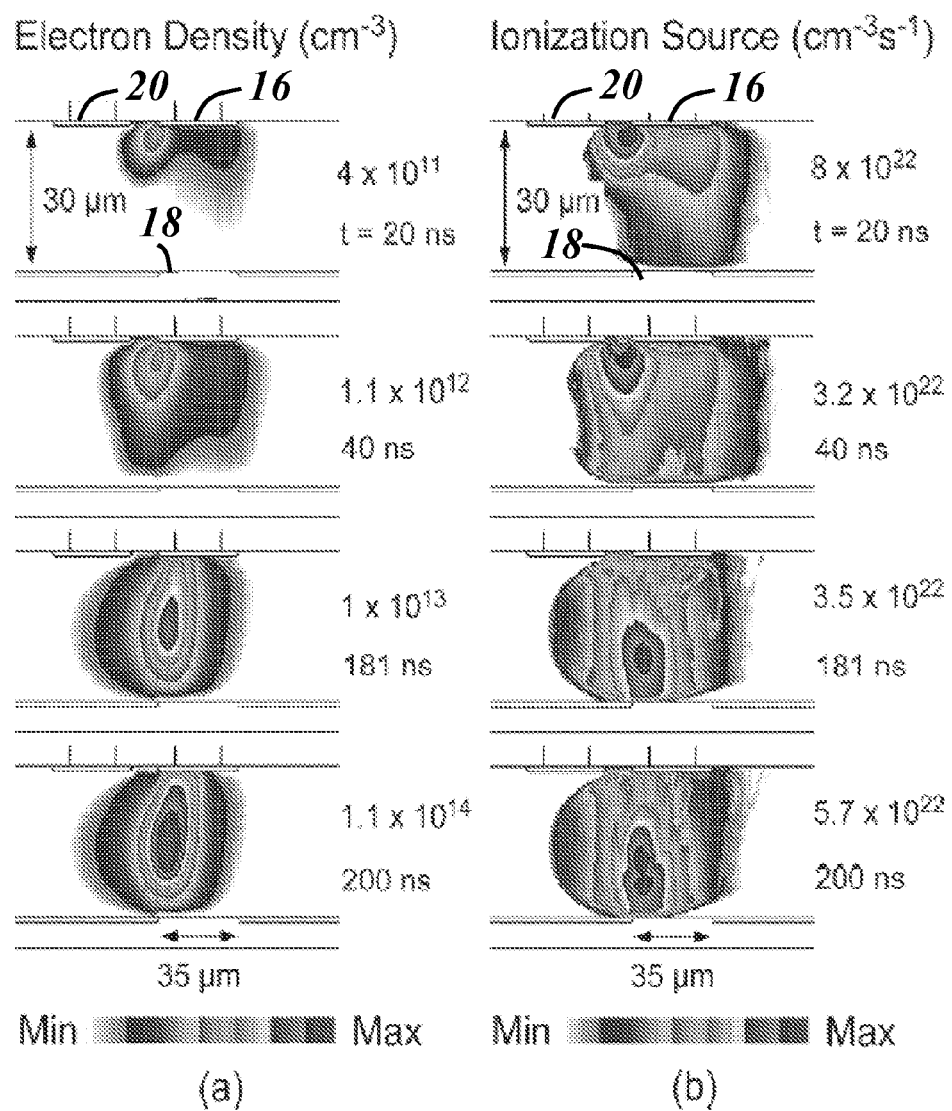
FIG. 6 are contour plots of simulated electron density (a) and ionization source (b) by bulk and secondary beam electrons for the sensor of FIG. 4(b) at various times after 480 V is applied at the anode at 770 Torr in argon (maximum values are given to the right of each plot)

FIG. 6 illustrates the simulated electron density (a) and ionization source (b) in the device of FIG. 4(b) (30 μm gap). Ballast resistors of 1000 Ω, 1000Ω and 20 MΩ are assumed in series with the reference cathode 20, the sensing cathode 18, and the anode 16, respectively. The pressure is 770 Torr, and the initiating current density from the cathodes 18, 20 is $10^{-4}$ A-cm$^{-2}$. The voltage at the anode 16 is 480 V with a rise time of 5 ns. Although the trends are similar to those of the smaller gap device of FIG. 4(a), there are qualitative differences due to the significantly larger gap and ballast resistor. Due to the now relatively closer proximity of the reference cathode 20 to the anode 16, the plasma initially makes connectivity between these two electrodes. The larger gap produces a smaller electric field between the sensing cathode 18 and the anode 16, so the relative contribution of electric field enhancement to ionization at the edges of the electrodes is greater. The larger ballast resistor produces a larger decrease in voltage across the plasma since, as current is collected, there is a larger voltage drop across the ballast resistor. This reduced voltage, combined with the larger gap, produces a lower electric field in the bulk plasma and a lower electron density, with a peak value of $10^{14}$ cm$^3$, compared to nearly $10^{16}$ cm$^3$ for the smaller gap device.

Sensor Fabrication

Figure 7:
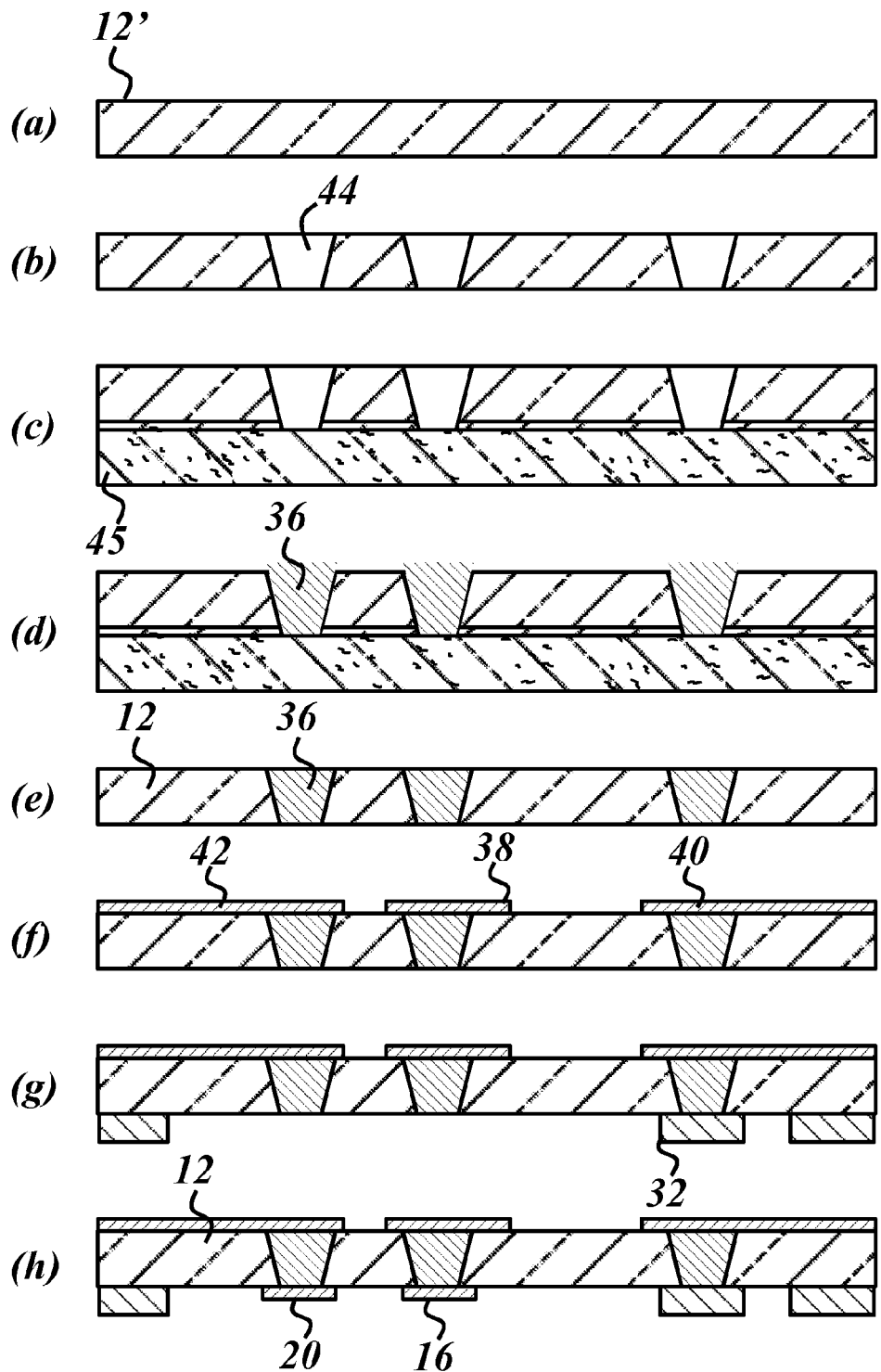
FIG. 7 is a schematic illustration of an exemplary process for making a sensor body.
Figure 8:
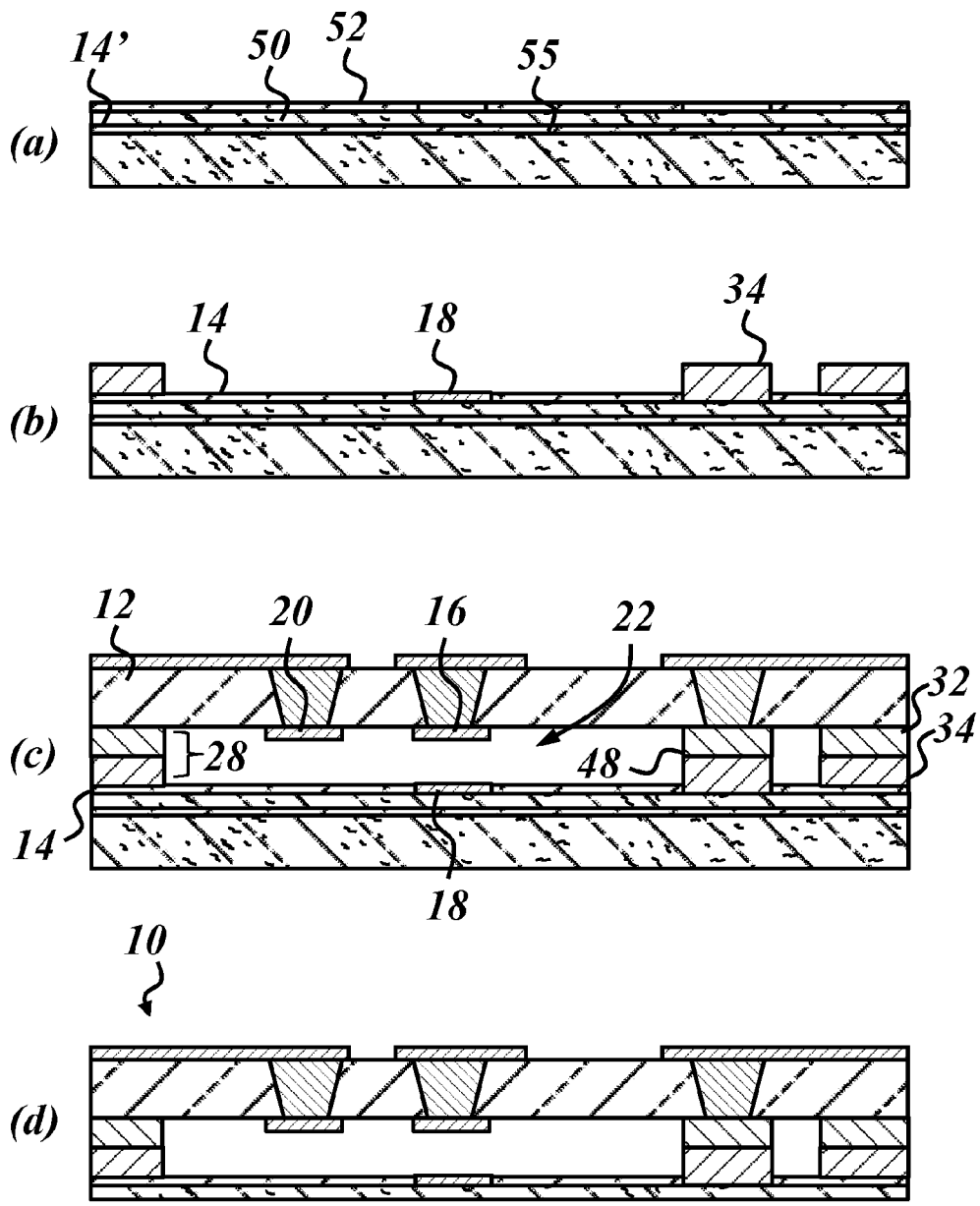
FIG. 8 is a schematic illustration of an exemplary process for making a sensor diaphragm.

In the following example, a fabrication process uses six masks: three masks for processing the sensor body 12, as shown in FIG. 7, and three masks for processing the diaphragm 14, as shown in FIG. 8. Referring to FIG. 7, fabrication of the sensor body 12 starts with a body substrate 12' (a) and includes forming holes 44 through the substrate by laser drilling or other means (b). The holes 44 are then prepared and filled by copper electroplating or other means to form the vias 36 (d). In this example, the body substrate 12' is bonded to a dummy wafer 45 by eutectic bonding or other means prior to plating (c). Both opposite sides are lapped away to obtain the sensor body 12 with vias 36 (e). The next steps include patterning the contact pads 38, 40, 42 on the exterior side of the sensor body 12 (f) and patterning a layer 32 of what will become the spacer 28 and the connector 48 on the opposite chamber side of the sensor body (g). The reference pair of electrodes 16, 20 is then patterned on the chamber side of the sensor body 12 (h) for eventual placement inside the microdischarge chamber 22.

Referring to FIG. 8, fabrication of the diaphragm 14 begins with a diaphragm substrate 14', which includes the conductive or semi-conducting layer 50. In this example, the substrate 14' also includes a buried, etchable release layer 55. The insulating layer 52 is patterned over layer 50 to subsequently accommodate the sensing electrode connector 48 and the sensing electrode 18 (a). Layer 34 is then patterned, including a portion of the subsequently formed connector 48 and a portion of the spacer or bond ring 28 (b). The sensor body 12 of FIG. 7 and the diaphragm 14 may then be aligned and attached together by eutectic bonding or other suitable technique (c). Post-bonding, the sensor 10 may be released from the handle wafer by a deep reactive ion etching (DRIE) process (d). In this example, the sensor body 12 is glass and the diaphragm 14 is doped-Si with an oxide insulating layer.

Figure 9:
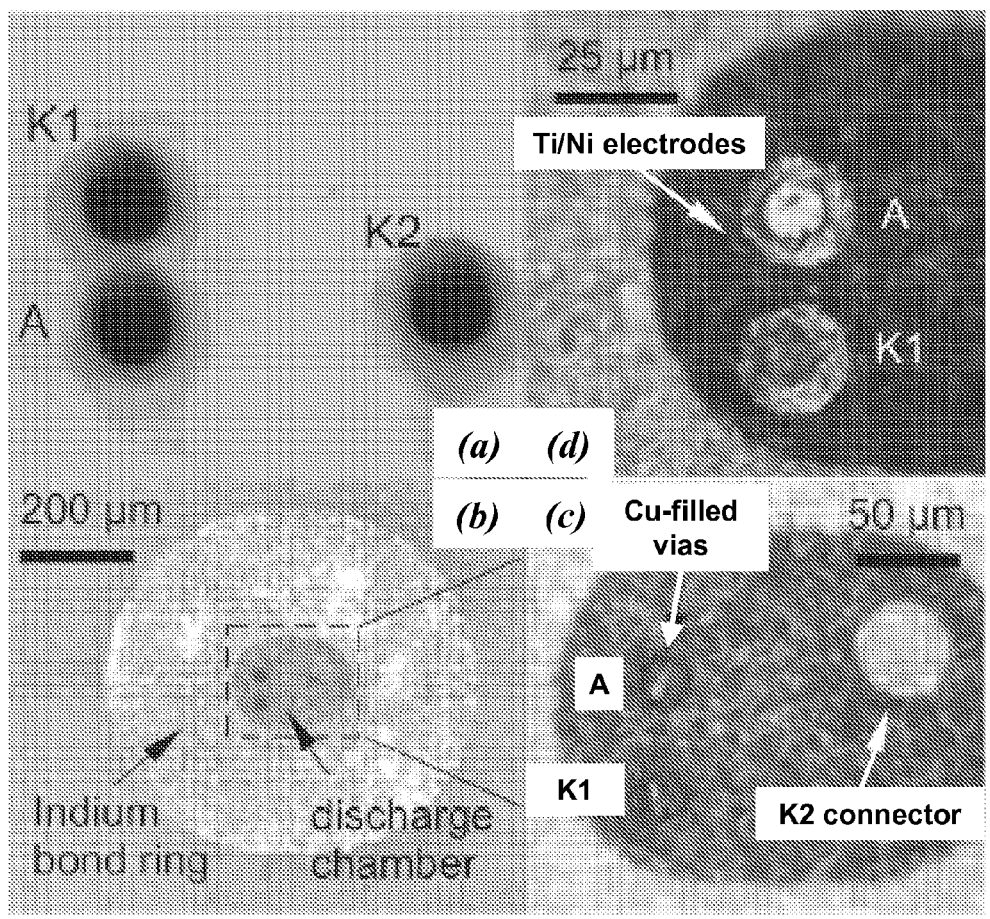
FIG. 9 includes the following photomicrographs: (a) the exterior side of a glass wafer body with laser-drilled holes; (b) through-glass vias (TGVs), a bond ring, and a sensing electrode connector on the chamber side of the glass, (c) the center portion of FIG. 9(b) showing the perimeter of the microdischarge chamber; and (d) the anode (A) and reference cathode (K1) patterned on the chamber side of the glass.

Fabrication of experimental examples in accordance with FIGS. 7 and 8 began with 300 μm-thick Schott Borofloat® glass wafers. In order to provide external electrical contact with the pressure sensor electrodes, which are located between the sensor body and diaphragm in the working device, the vias were formed through the glass wafer by laser drilling (Precision Microfab, Severna Park, Md.) using a 193 nm ArF excimer laser. This machining process has a depth control of approximately ±5 μm, a lateral precision of 1-2 μm, and a profile taper of 88.1°. The actual machined holes were 47.5 μm on the exterior side of the sensor body and 15.8 μm on the opposite chamber side of the sensor body for a machining profile of 87°. A photomicrograph of a portion of the glass wafer with laser drilled holes is shown in FIG. 9(a), where holes for vias corresponding to the anode, reference cathode, and sensing cathode are respectively labeled A, K1, and K2.

A variety of methods can be used for forming the vias to achieve the electrical connection through the holes, including thin-film deposition, packing and melting of solder balls or powder, or electroplating, to name a few. For the experimental device, Cu-electroplating was employed. The high aspect ratio of the vias can make it difficult to achieve sufficient sidewall coverage for reliable electrical contacts using thin film deposition in some cases. And the use of solder particles may be limited by inconsistent reflow when heated to the melting temperature (183° C. for 37Pb/63Sn) and beyond (up to 280° C.). Although the exact cause of this behavior has not been determined, it may be related to the large ratio of surface area to volume, which tends to prevent recrystallization. Electroplating provides consistency and scalability. Indium (In) and Cu are examples of suitable metals for forming the vias, though a variety of plating metals are available. Indium has a low reflow temperature (156° C.), which allows for temperature cycling post-plating in order to remove pinholes or voids. Copper offers lower electrical resistivity and a relatively high plating rate. The higher re-melting temperature can also accommodate a higher operating temperature for the pressure sensor. Both metals were successfully plated in experiments.

Before electroplating, the glass wafer was attached to a dummy Si wafer coated with a metal seed layer (e.g., Ti/Au) for electroplating (see FIG. 7). Steps were taken to maintain close contact and to minimize movement between the glass wafer and the seed layer. In this case, the dummy Si wafer was bonded to the glass wafer using Au—In eutectic bonding. Other options include using photoresist to attaching the dummy wafer, or using electroless plating to fill the vias. The glass wafer was coated with a thin layer of Ti/Au 30 nm/300 nm. The dummy Si wafer was coated with a layer of Ti/Au 30 nm/300 nm and a 4-6 µm-thick electroplated indium layer. Following a degassing step to remove bubbles from the vias, Cu-plating was performed (Enthone Cuprostar® CVF1) at 24° C. Pulse plating with periodic reversal of polarity was used to provide uniform plating across the TGVs. The effective current density was 15-20 mA/cm$^2$. After plating, the stacked structure was lapped from both opposite sides to remove excessive metal build-up, to planarize the surface of the plated side, and to grind off the dummy Si wafer. The measured resistance of the fabricated TGVs was less than 5 Ω.

The next processing steps involved patterning the metal contact pads on the exterior side of the glass, followed by patterning indium as a portion of the bond ring and patterning Ti/Ni electrodes (i.e., the anode and the reference cathode) on the chamber side of the glass. The Ti/Au (30 nm/300 nm) contact pads were patterned using a lift-off technique. To prevent discharges outside the chamber (i.e., across the contact pad features), the corresponding contacts for the anode and the two competing cathodes were spaced farther apart at the exterior of the sensor body compared to their spacing inside the chamber (10 µm), then partially coated with an insulating layer of epoxy above the TGVs as shown in FIGS. 1A and 1B.

The In-portion of the spacer or bond ring, along with the In-portion of the connector that extends across the microdischarge chamber to connect the sensing electrode with the appropriate via and the corresponding contact pad at the exterior of the sensor, may then be formed by evaporation and lift-off (FIG. 9(b)). In this example, the In layer was 4 µm-thick and coated with a 50 nm-thick layer of Au for protection. The Ti/Ni (20 nm/200 nm) electrodes (34.5 µm in width) were formed on the chamber side by lift-off with a spacing of approximately 11.1 µm between the anode and the reference cathode. As shown in FIG. 9(d), the TGVs and Ni electrodes are sufficiently aligned.

Diaphragm construction began with SOI wafers including a Si device layer (5 µm-thick), a buried silicon dioxide layer (2 µm-thick), and a Si handle wafer (500 µm-thick). The Si device layer included As doping for low resistivity (<0.005 Ω-cm) and provides the electrical path between the sensing electrode and the Au/In connector that spans the microdischarge chamber to the appropriate via and the corresponding contact at the exterior of the sensor body. The buried oxide layer provides a well-defined etch stop, which later facilitates the release of the Si device layer by a backside dry etch of the handle wafer.

Silicon dioxide was grown (100 nm-thick, by dry oxidation at 1000° C.) and then deposited (900 nm-thick low temperature oxide) for a total thickness of 1 µm on the Si device layer to provide electrical isolation of the bond ring from the sensing electrode and contact. The oxide was patterned using a dry etch process based on $CHF_3$ and $CF_4$ to expose the doped device layer for the sensing cathode connector. Next, the gold portion of the bond ring and the connector was deposited as an 8 µm-thick layer by electroplating. The oxide was then removed at the desired location of the sensing electrode cathode, which was subsequently formed by sputtering and lift-off of Ti/Ni (20 nm/200 nm).

Eutectic bonding can be performed at a relatively low initial melting temperature (200° C.) for the bonding step with the potential for high re-melting temperatures (e.g., 500° C. with Au—In). Eutectic bonding is suitable for a variety of surface profiles and offers a controlled bond thickness, which in this application determines the size (height) of the microdischarge chamber. Au—In bonding is used here, but other eutectic systems are possible. In addition, other non-eutectic bonding systems can be used, and the bonding system need not provide the entire spacer thickness. Au—In systems include In-rich and Au-rich bonding. If the weight percentage of In is higher than 54%, In-rich bonding results, and the alloy is a mixture of In and $AuIn_2$, which means the re-melting or de-bonding temperature is still 156° C. If the weight percentage of In is in the range from 36.8-54%, Au-rich bonding results, and the alloy is a mixture of AuIn and $AuIn_2$ intermetallic compounds with a re-melting temperature of 495.4° C. Au-rich bonding may be utilized to achieve a relatively high operating temperature (≈500° C.).

Figure 10:
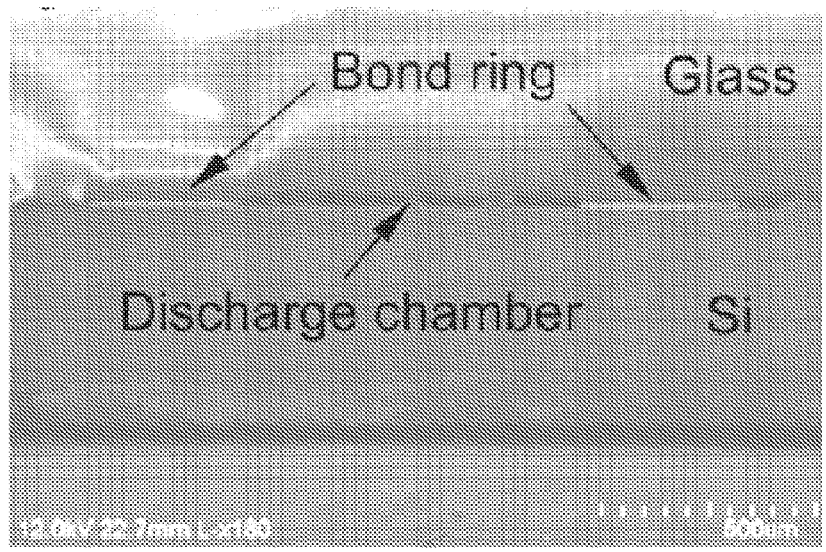
FIG. 10 is an SEM cross-sectional view through a eutectic bond ring.

This bonding process and results do not depend on the type of bonded materials (either glass or silicon). In this experimental investigation of the bonding process, glass and silicon test chips with Au—In bond rings were used. Both cases (Au-on-glass/In-on-silicon and Au-on-silicon/In-on-glass) were studied and successfully bonded. The bonding was performed in a vacuum oven at 200° C. with a pressure of 1 MPa or greater applied for 90-120 minutes. FIG. 10 is an SEM image of a cross-section of the bond ring structure. Electron dispersive spectroscopy (EDS) was used to evaluate the composition of the bond ring, which showed interdiffusion of the Au and In layers that form the intermetallic compounds.

Experimental Results

Figure 11:
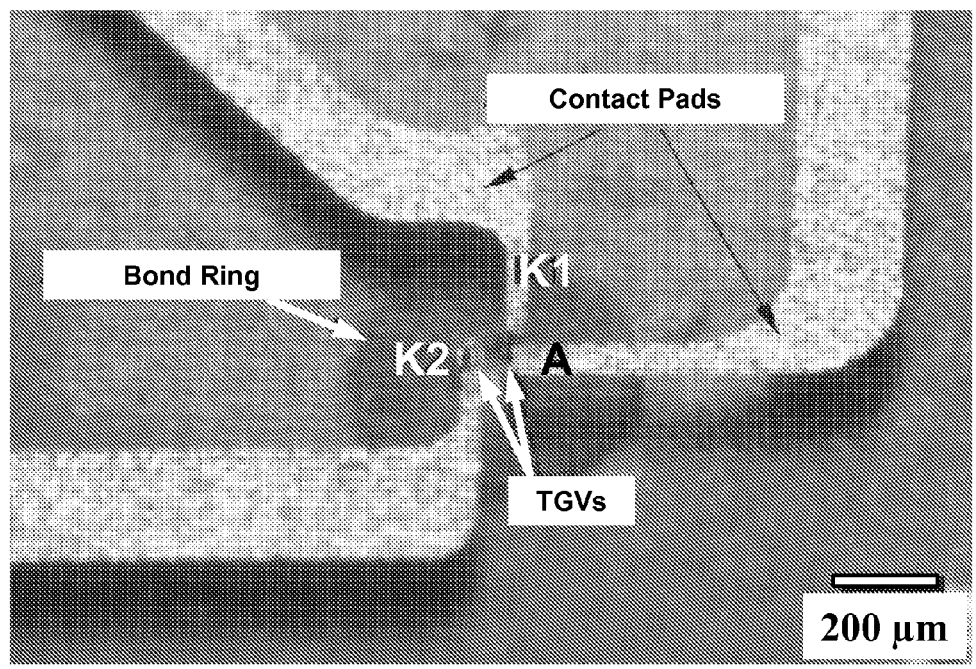
FIG. 11 is a photomicrograph of a sensor constructed according to the process of FIGS. 7 and 8, shown from the glass sensor body side with gold contact pads formed along the exterior side of the glass.

To evaluate the impact of multiple conditions for the interior of the microdischarge chamber, a test structure was constructed in which the SOI wafer was thinned to 100 µm, but the handle wafer was not completely removed. A photomicrograph of the fabricated sensor is shown in FIG. 11 from the glass side. Electrical characterization was performed with a glass chip and a SOI chip that were held together with a porous epoxy bond instead of a eutectic bond. The test structure was left unsealed and tested in an argon environment.

Figure 12:
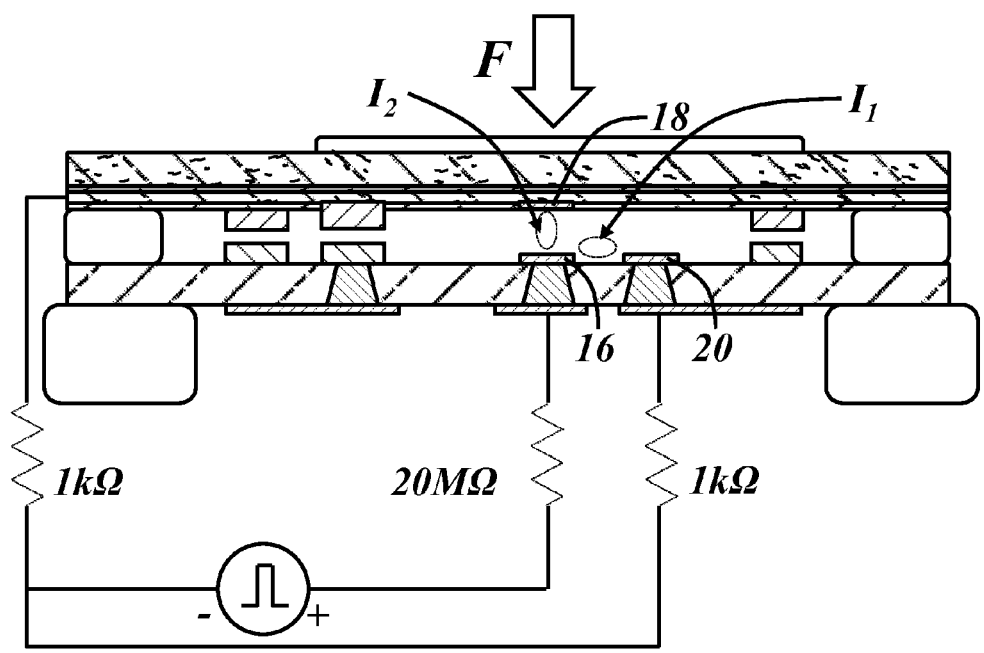
FIG. 12 is a schematic illustration of an experimental sensor test setup with a micromanipulator that applies force to the diaphragm to simulate deflection from external pressure.

The experimental setup is illustrated schematically in FIG. 12. A piezoelectric actuator was used to apply a force F at the center of the assembled chip to induce diaphragm deflection and thus simulate a large external pressure. Voltage pulses of 1 ms duration were applied to the anode 16. Multiple microdischarge pulses were produced during each voltage pulse. Ballast resistor values of 10 MΩ and 20 MΩ were utilized in separate sets of experiments, while the currents $I_1$ and $I_2$ going through two competing cathodes 20, 18 were captured as voltages across 1 kΩ resistors.

Figure 13:
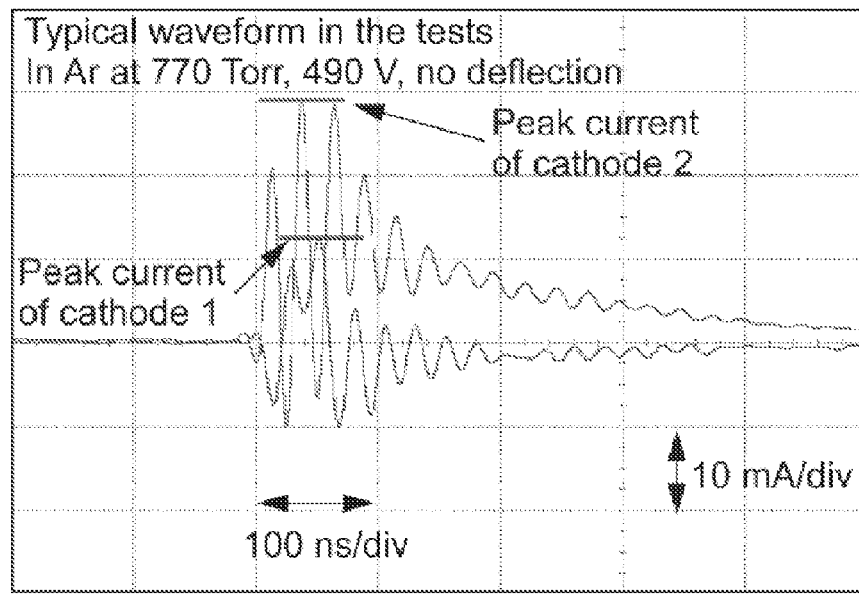
FIG. 13 is a plot of a representative waveform produced in experiments conducted with an exemplary sensor construction.

A representative waveform of a single microdischarge pulse is shown in FIG. 13. The typical duration is several hundred nanoseconds with decaying oscillation. Possible sources of parasitic capacitance, to which the oscillation may be attributed, include the oscilloscope probes connected to the competing cathodes. When a voltage pulse is applied to the anode, it also charges the parasitic capacitance on the anode, which can potentially contribute to the peak transient discharge currents.

Figure 14:
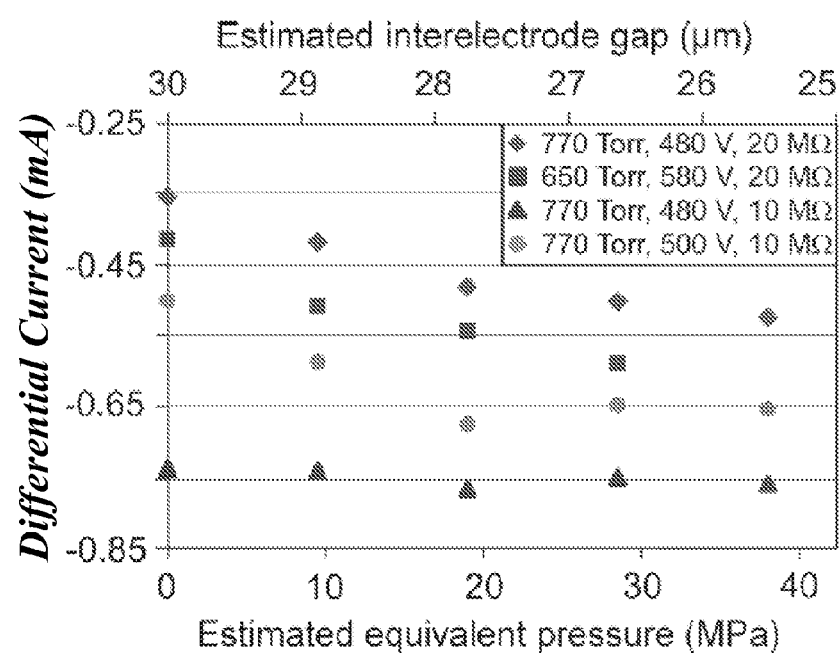
FIG. 14 is a plot of differential current as a function of estimated equivalent pressure and estimated inter-electrode gap at various pressures in argon, applied voltages, and various ballast resistors.

The relationship between differential current and estimated equivalent pressure is plotted in FIG. 14. The force applied to the diaphragm was converted to equivalent pressure using FEA. In four sets of experiments, the effect of chamber pressure, applied voltage, and ballast resistor was investigated. When the ballast resistor value increases, the nature of the microdischarges changes and impacts the distribution of the cathode currents. For a chamber pressure of 770 Torr and a 20 MΩ ballast resistor, the operating voltage was 480 V and the differential currents ranged from −0.35 to −0.5. With a smaller 10 MΩ ballast resistor, the differential currents uniformly decreased.

Although the experimental device was intended to operate with the microdischarge chamber at about 1 atm, the impact of lower pressure was also evaluated with the test structure, also shown in FIG. 14. At an interior pressure of 650 Torr, the (fractional) current in the reference electrode was lowered, as expected from the increase in the mean free path. Additionally, the operating voltage increased from 480 V for 770 Torr to 580 V for 650 Torr. The impact of operating voltage on the discharge characteristics is also evident in FIG. 14.

For the microdischarge chamber pressure of 770 Torr and a 10 MΩ ballast resistor, two voltage pulse magnitudes were evaluated: 480 V and 500 V. For the 480 V pulses, the resulting differential current distribution as a function of diaphragm deflection did not indicate a clear trend with this particular configuration. But at 500 V, the effect of deflection on differential current is apparent in FIG. 14. This may indicate the existence of a minimum threshold for the operating voltage for the pressure sensor. Based on the electrical results, the mechanical load changed the spacing between the anode and the sensing cathode up to about 5 μm in these experiments. This corresponds to the deflection expected from a 5 μm thick diaphragm of oval shape under an external pressure of about 40 MPa as described in conjunction with FIG. 3.

Thus, the particular electrode arrangement described in the examples above—with the anode and the reference cathode on the sensor body substrate and the sensing cathode on the diaphragm—produces a differential current output that is a function of diaphragm deflection. For an electrode spacing of about 10 μm between the anode and the sensing cathode, the differential current changed by about 20% as the spacing changed from about 30 μm to 25 μm. It has been demonstrated that microdischarges can be initiated at voltages below 500 V in an Ar-filled microdischarge atmosphere at about 1 atm pressure. In the experiments described above, the peak current levels were at a level of ~10 mA, and pulse durations were ~100 ns, which permits the discharge to remain relative energy efficient. The above-described computer modeling confirms the roles of the two cathodes in the operation of the sensor. The microdischarge appears to be initiated in the gap between the anode and the reference electrode and travels to the space between the anode and the sensing electrode. The two cathodes then compete for current. The modeling also shows that the device can operate over a wide range of sensing gaps, at least from 10 μm to 30 μm. Other configurations and fabrication techniques are possible and may be developed within the scope of this disclosure in which differential microdischarge currents are shown to offer a viable approach to sensing diaphragm deflection. These principles may be implemented in a variety of devices, such as gas or liquid pressure sensors, that are particularly useful in harsh environments.

Other embodiments of the sensor, such as those with reversed-polarity and/or electrodes with plasma-concentrating features, may have exterior volumes as small as 0.002 mm$^3$ or less and microdischarge chamber volumes as small as $5\times10^{-6}$ mm$^3$ or less. For instance, configuring the above-described three-electrode microdischarge sensor to operate with a cathode and two competing anodes (i.e., a sensing anode and a reference anode) can enhance the sensitivity of the discharge current distribution to interelectrode spacing, allowing further miniaturization. Electron current appears to exhibit greater spatial variation than ion current, enabling a useful diaphragm displacement in a smaller range and, accordingly, the use of smaller discharge gaps.

Figure 15:
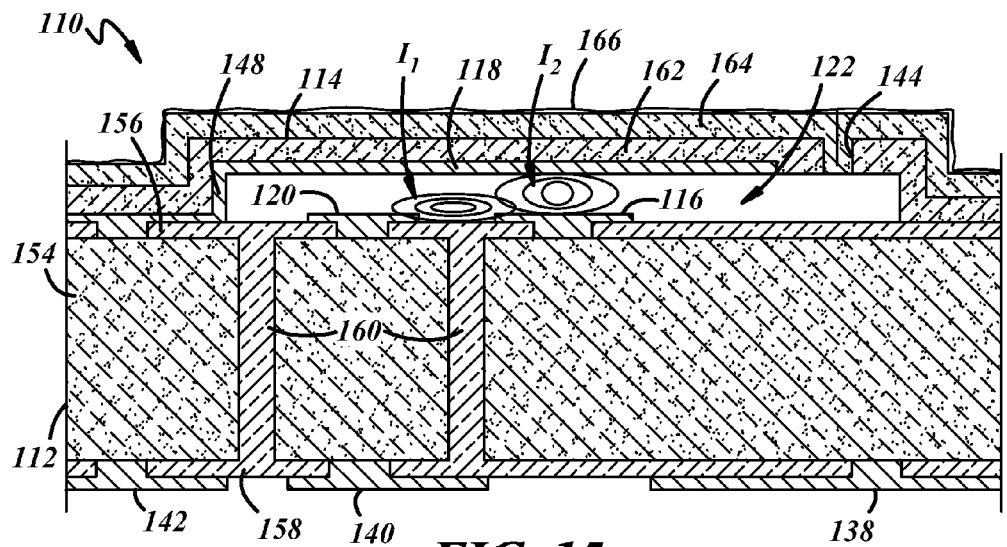
FIG. 15 is a cross-sectional view of an embodiment of a microdischarge-based sensor with reversed polarity.
Figure 16:
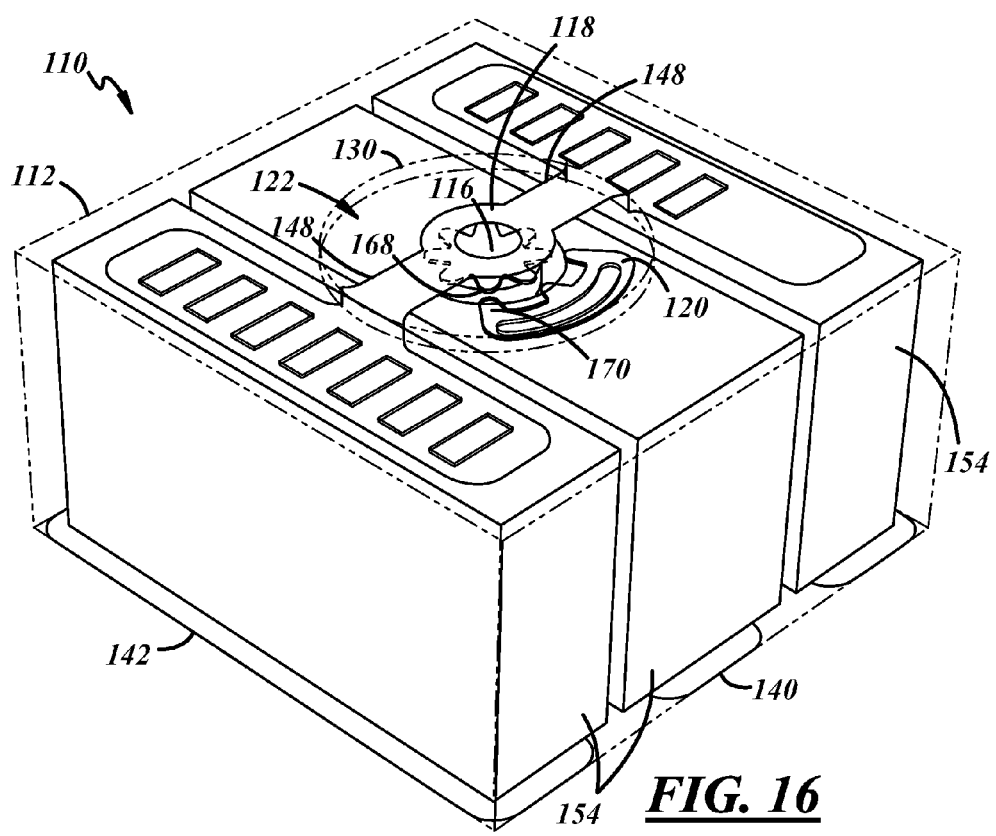
FIG. 16 is a perspective view of the sensor of FIG. 15 with the diaphragm layers omitted.
Figure 17:
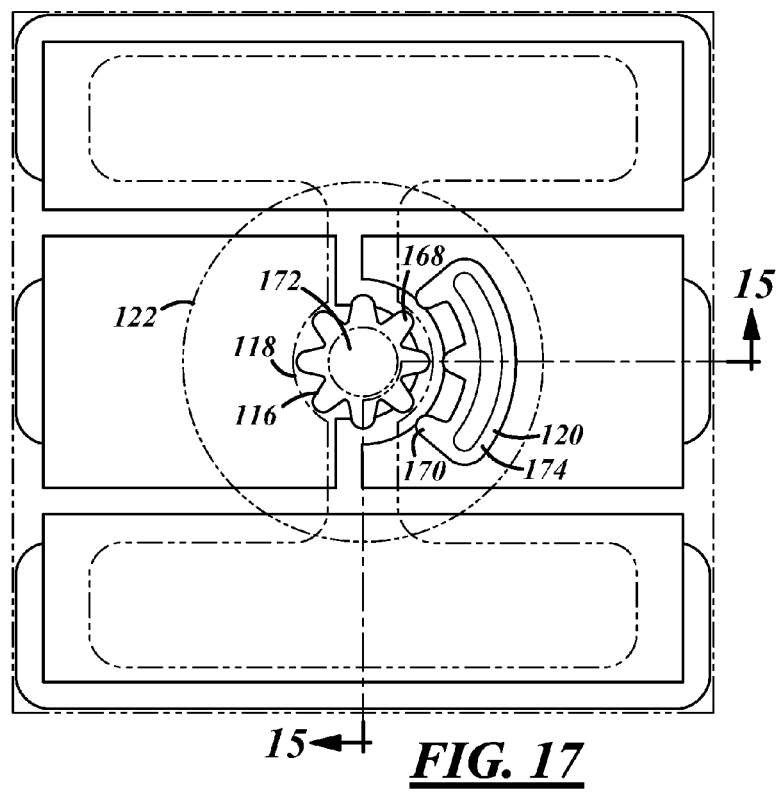
FIG. 17 is a top view of the sensor of FIGS. 15 and 16 with the diaphragm layers omitted and the sensing electrode shown in phantom.

An example of this type of sensor 110 is illustrated in FIGS. 15-17. FIG. 15 is a cross-sectional view of the sensor 110. In this example, the body 112 of the sensor 110 includes a conductive or semi-conducting layer 154 with insulating layers 156, 158 on opposite chamber and exterior sides of layer 154. The first and third electrodes 116, 120 are the respective cathode and reference anode in this case, and each is located on the body 112 and exposed in the discharge chamber 122. The sensing anode 118 is located on the diaphragm 114. The body 112 includes insulating walls 160 extending through the conductive layer 154 and between the insulating layers 156, 158. The insulating walls 160 are arranged between locations where each electrode makes electrical contact with the conductive layer 154 to isolate the electrical paths between each of the electrodes 116, 118, 120 and associated contacts 138, 140, 142 from one another. The conductive layer 154 thus performs the function of the TGVs of the example of FIGS. 1A and 1B.

The example of FIG. 15 does not include a separately formed spacer or bonding ring to partly define the discharge chamber 122. Instead, the diaphragm 114 and the sensing anode 118 are formed in layers that have a stepped configuration to define the chamber 122 between the body 112 and diaphragm. The connector 148 that extends between the diaphragm 114 and body 112 is thus formed from the same layer of material as the sensing anode. The diaphragm 114 is formed from two layers 162, 164 in this example, and a sealing layer 166 is included on the exterior side of the diaphragm. The first layer 162 of the diaphragm includes one or more holes or openings 144 formed therethrough, which are filled by the second layer 164. These openings 144 are provided to remove material between the first layer 162 and the body 112 to form the microdischarge chamber 122 during sensor fabrication, an example of which is described in more detail below.

A perspective view of the sensor 110 is shown in FIG. 16 with the diaphragm omitted to better illustrate the electrode configuration. The perimeter 130 of the microdischarge chamber 122 is shown in phantom, as are the insulating layers and walls 156, 158, 160. In this example, the sensing electrode (anode) 118 is ring-shaped. Two connectors 148 extend away from the sensing anode in the plane of the sensing anode 118 in opposite radial directions and turn toward the body 112 at the perimeter of the discharge chamber 122 to form electrical connections with two electrically separate portions of the conductive layer 154 of the body. The cathode 116 and the reference anode 120 each respectively include one or more plasma-concentrating features 168, 170 to help control the location of initial plasma formation within the chamber 122. In this case, pairs of features 168, 170 in the form of lobes or fingers extend toward each other to define a minimum gap between opposing electrode edges.

FIG. 17 is a top view of the sensor 110 with the diaphragm omitted and the ring-shaped sensing electrode 118, associated connectors 148, and discharge chamber 122 shown in phantom. This view better illustrates the configuration of the cathode 116 and reference anode 120. The cathode 116 includes a round body 172 and a plurality of fingers 168 equally spaced along its perimeter and extending radially away from the body. The distal ends of the fingers 168 are aligned with the outer perimeter of the ring-shaped sensing anode 118, and the proximal ends of the fingers 168 are generally aligned with the inner perimeter of the anode 118.

The reference anode 120 includes a curved or arc-shaped body 174 and a plurality of fingers 170 equally spaced along the inside of the arc-shape and extending generally toward the center of the cathode 116. Each one of the fingers 170 of the reference anode 120 is a plasma-concentrating feature that opposes a companion finger 168 of the cathode 116, defining a gap where plasma initiation between the reference pair of electrodes is most likely to occur. Such plasma-concentrating features are optional. In some cases, it may be desired to include plasma-distribution features such that plasma initiation and propagation occurs more uniformly between electrodes. For instance, the cathode 116 may be round and the reference electrode 120 may be ring-shaped, surrounding the cathode with a constant gap therebetween.

Figure 18:
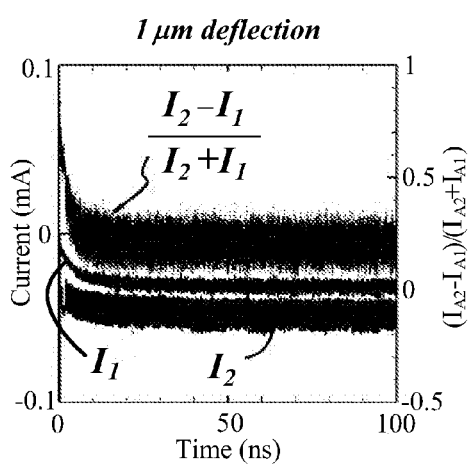
FIG. 18 is a plot of current responses to simulated diaphragm deflection for the sensor of FIGS. 15-17.
Figure 19:
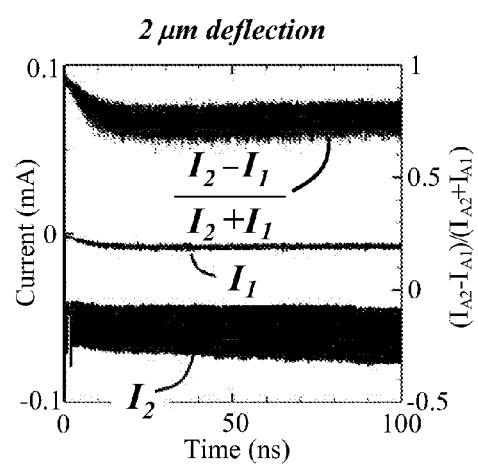
FIG. 19 is a plot of current responses to further simulated diaphragm deflection for the sensor of FIGS. 15-17.

Modeling indicates that the sensor 110 of FIGS. 15-17 can be made as small as 100 μm×100 μm×_200 μm. The microdischarge chamber may be as small as 50 μm in diameter or smaller, and only 3 μm or less in height. Interelectrode spacing can also be reduced to 3-5 μm while still operating in a useful range. Modeling was conducted on ring-shaped sensing electrodes and on disc-shaped sensing electrodes at 1 atm (760 Torr) in argon. The operating voltage was −200V applied at the cathode, and the ballast resistors for the anodes and for the cathode were 1 kΩ and 1 MΩ, respectively. FIGS. 18 and 19 are plots of current as a function of diaphragm deflection, where the sensing anode is modeled as an 18 mm diameter disc deflected at the center. FIG. 18 shows the results for a diaphragm deflection of 1 μm, and FIG. 19 shows the results for a diaphragm deflection of 2 μm, both with a 3 μm discharge chamber height. In each plot, the lowermost band is $I_2$ (the current associated with the sensing pair of electrodes), the middle band is $I_1$ (the current associated with the reference pair of electrodes), and the uppermost band is the differential current: the ratio of $I_2-I_1$ to $I_2+I_1$.

Figure 20:
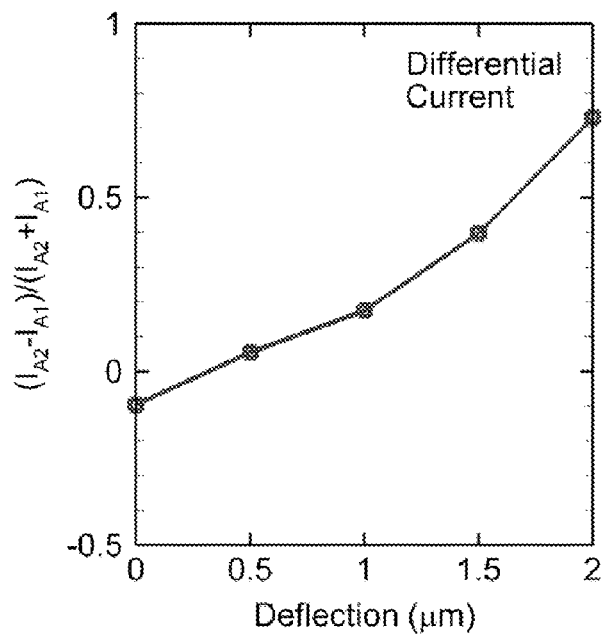
FIG. 20 is a plot of differential current modeled as a function of diaphragm deflection for the sensor of FIGS. 15-17.

The results from the ring-shaped sensing anode were similar, but with improved current balance among the anodes due to a lower sensing current $I_2$. The modeling also indicated that the differential current is not sensitive to the pressure change within the discharge chamber caused by diaphragm deflection, nor is it sensitive to temperature changes from room temperature to 200° C. FIG. 20 is a plot of the overall results of differential current as a function of deflection at the above-stated conditions.

Figure 21:
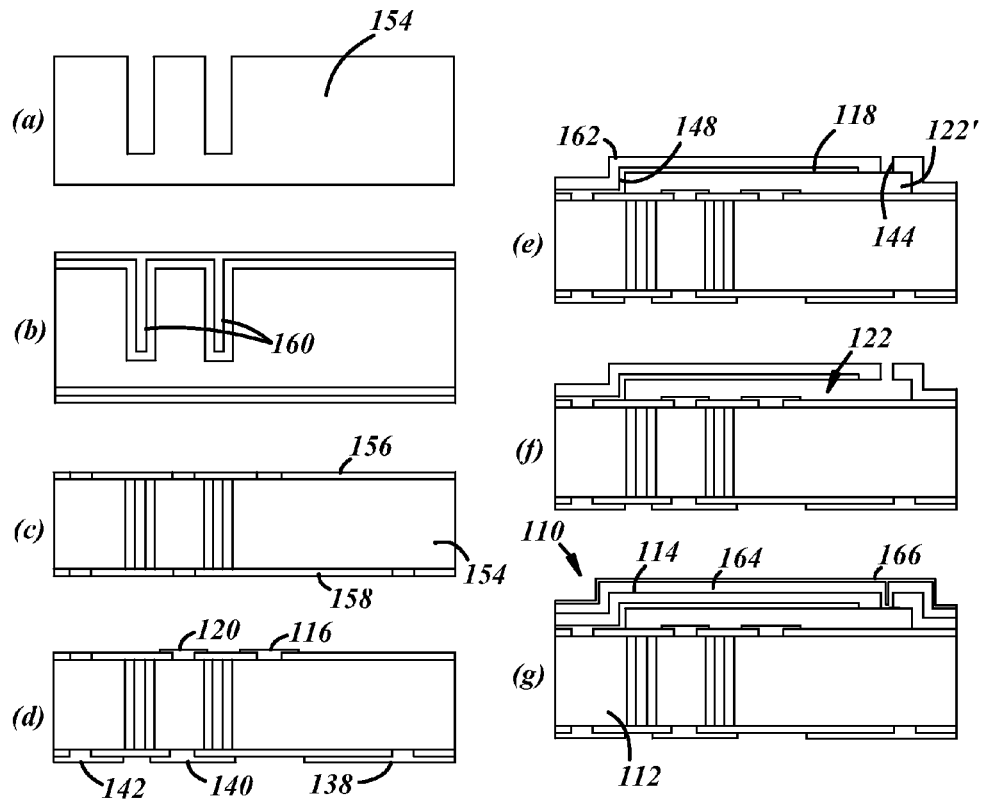
FIG. 21 is an exemplary single-wafer process for fabricating an embodiment of the sensor.

FIG. 21 illustrates an example of another process for making the above-described sensor. The particular process of FIG. 21 is shown fabricating the microdischarge sensor of FIGS. 15-17 and is a single wafer, eight-mask process. FIG. 21 also demonstrates the capability of the same process for use in fabricating a capacitive sensor with slight modification to the final steps. In this example, the starting substrate 154' becomes conductive or semi-conducting layer 154. A p-type semi-conducting Si-wafer is one example of a suitable starting substrate. The substrate 154' is etched at the desired locations for the insulating walls 160 (see FIG. 15) by a DRIE process, for example (a). The wafer is then subjected to a thermal oxide process and TEOS oxide filling step to form the insulating walls 160 (b). The wafer is thinned from both opposite sides, and oxides or other insulating layers 156, 158 are patterned (e.g., by plasma-enhanced CVD) on each of the opposite sides of the wafer with openings at the desired electrode and contact locations (c). The cathode 116 and reference anode 120 are formed on the wafer body from Ti/Ni or other suitable conductor, and the exterior contacts 138, 140, 142 are formed on the opposite side of the wafer body from aluminum or other suitable conductor (d). A layer 122' of α-Si or other sacrificial material is deposited in the desired location, shape, and size of the microdischarge chamber (e). The conductive layer that forms the sensing anode 118 and the connector 148 that connects the sensing anode to the body is then deposited, followed by a first layer 162 of silicon nitride or other diaphragm material (e). The layer 162 is patterned to include the opening 144, which subsequently serves as an etchant access opening. The sacrificial material 122' is removed by introducing an etchant, such as $XeF_2$, thereby forming the discharge chamber 122 (f). A second diaphragm layer 164 such as silicon nitride is deposited over the first layer 162 and closes the etchant access opening (g). A sealing layer 166 of $Al_2O_3$ or other suitable material may be deposited over the diaphragm 114 and/or other portions of the sensor, such as by atomic layer deposition (ALD) (g).

The sensor 110 fabricated in steps (a)-(g) of FIG. 21 can be configured to function as a microdischarge-based sensor, as a capacitive sensor, or as both types of sensors. An intervening step (f2), illustrated in FIG. 22, can optionally be performed between steps (f) and (g) to form a contact-mode capacitive sensor 210. In step (f2) an insulating layer 276 is coated over the inside of the walls of the cavity 222 formed by the etching step (f) before the second diaphragm layer 264 and the sealing layer 266 are deposited in step (g). The insulating layer 276 is a layer of $Al_2O_3$ deposited by ALD, in an example. The resulting contact-mode capacitive sensor 210 accommodates larger deflection of the diaphragm 214— i.e., up to the entire gap between the diaphragm and body of the sensor—because the opposing surfaces of the electrodes are insulated to prevent current flow or arcing therebetween. In this particular example, a modified step (d) (not shown) may be employed to form the single larger electrode 216 on the body side of the cavity 222 and/or a single larger contact 238 on the opposite side of the body 212, as shown. A modified step (b) may also be employed to form only one insulating wall 260, a shown. These modified steps can be used to form a non-contact capacitive sensor as well. In an example, the diaphragm diameter may range from about 100 μm to 2000 μm.

Figure 23:
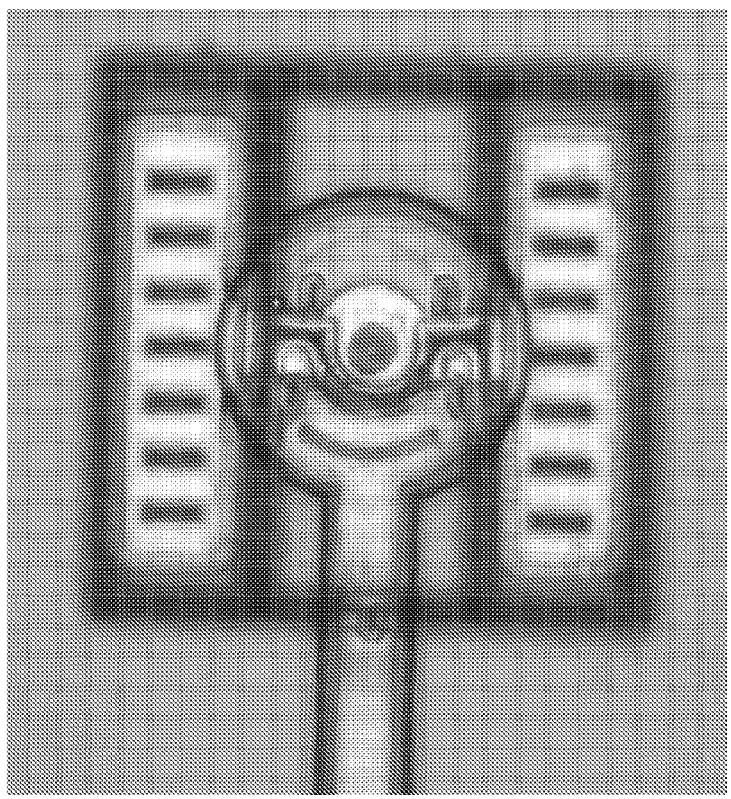
FIG. 23 is a photomicrograph of a microdischarge-based sensor with a 50 μm diameter microdischarge chamber.
Figure 24:
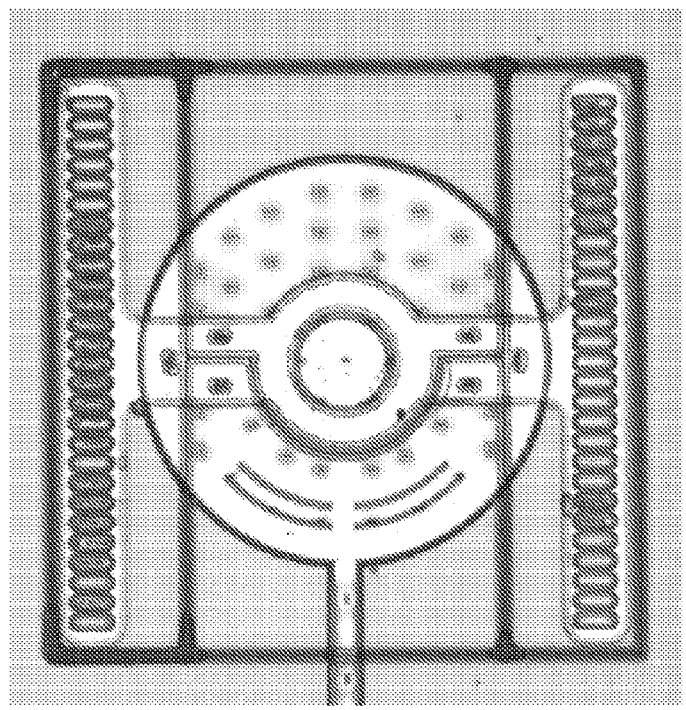
FIG. 24 is a photomicrograph of a microdischarge-based sensor with a 200 μm diameter microdischarge chamber.
Figure 25:
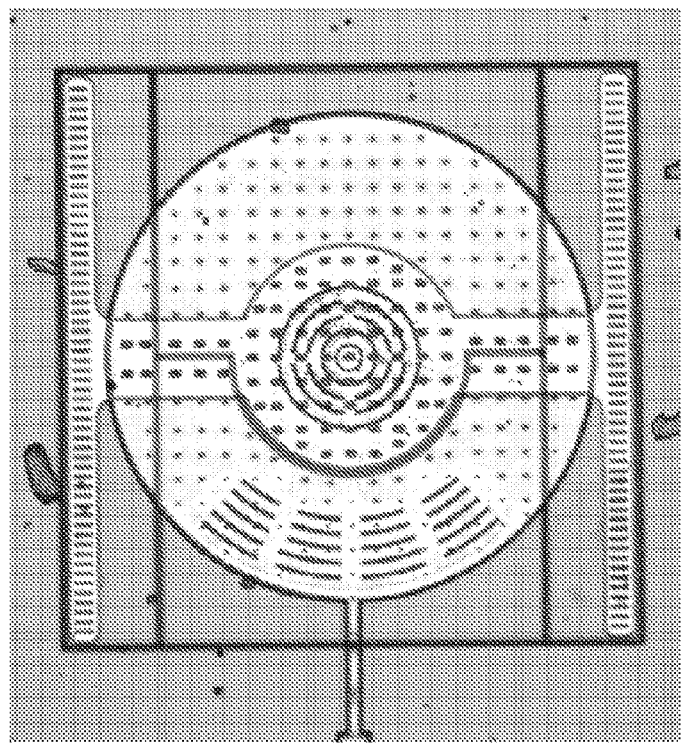
FIG. 25 is a photomicrograph of a microdischarge-based sensor with a 500 μm diameter microdischarge chamber.

FIGS. 23-25 are photomicrographs of microdischarge-based sensors constructed according to the process of FIG. 21. Each is constructed similar to that of FIGS. 15-17, including lobed cathodes and reference anodes with plasma-concentrating features. The large circular shape in each figure is the perimeter of the microdischarge chamber, and the regular pattern of spots located within the perimeter of the chamber are the etchant access openings described in conjunction with FIG. 21. The diameter of each of the microdischarge chambers of FIGS. 23-25 is respectively 50 µm, 200 µm, and 500 µm.

Figure 22:
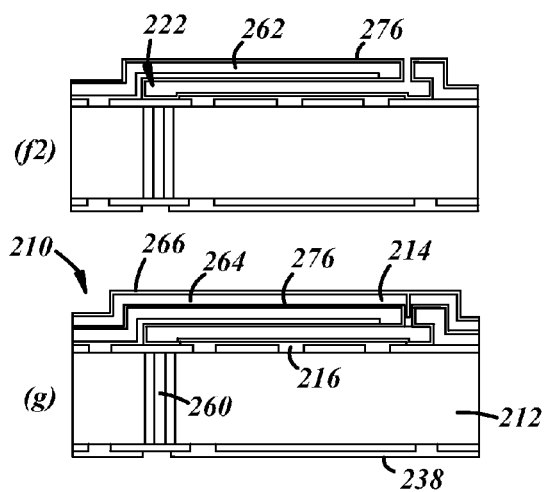
FIG. 22 illustrates alternative steps of the single-wafer process of FIG. 21 for fabricating a capacitive sensor.
Figure 26:
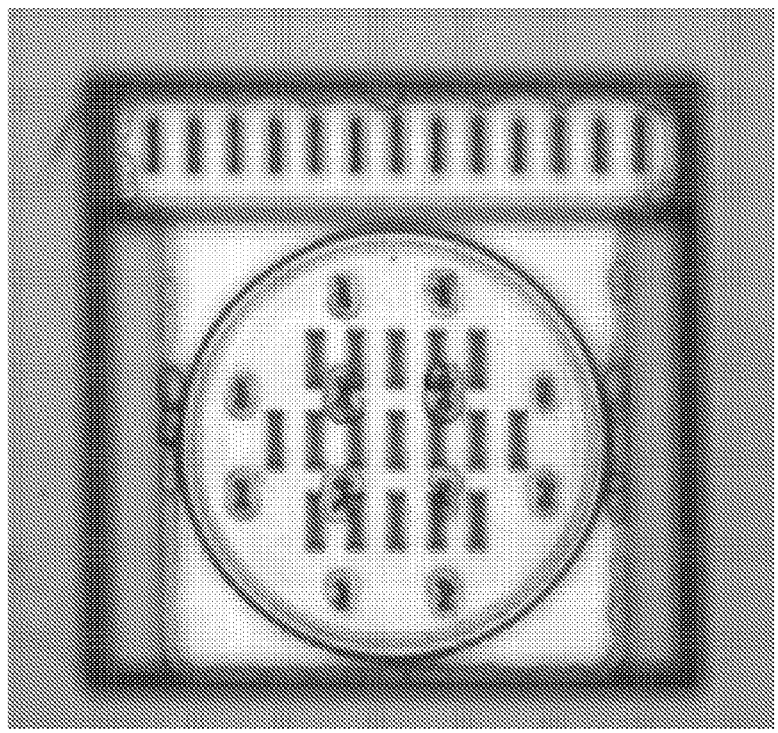
FIG. 26 is a photomicrograph of a capacitive sensor with a 100 μm diameter chamber.
Figure 27:
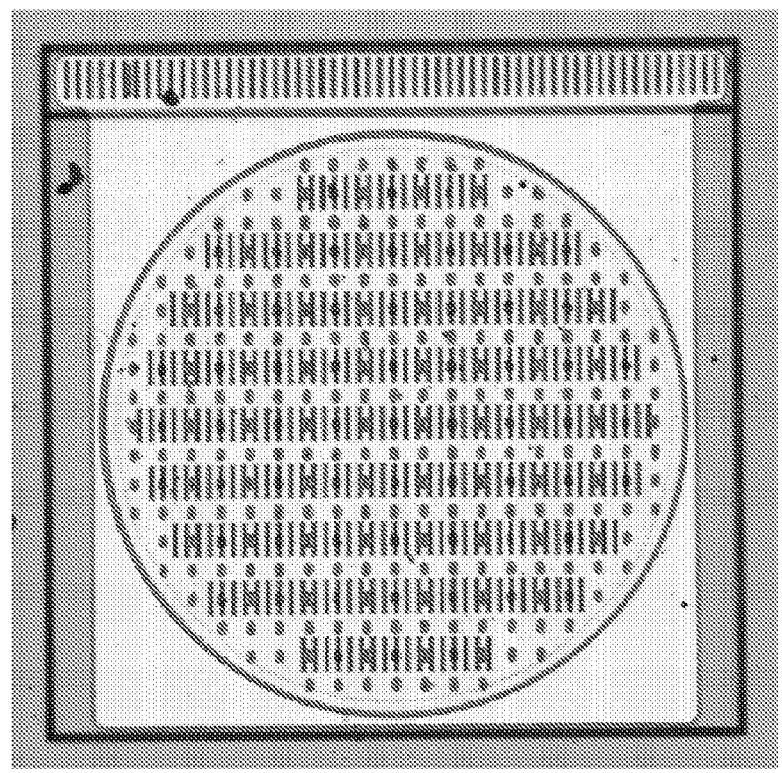
FIG. 27 is a photomicrograph of a capacitive sensor with a 500 μm diameter chamber.

FIGS. 26 and 27 are photomicrographs of capacitive sensors constructed according to the process of FIGS. 22 and 23. The large circular shape in each figure is the perimeter of the gap between opposing electrodes, and the regular pattern of oblong spots located within that perimeter are the etchant access openings. The diameter of each of diaphragm of FIGS. 26 and 27 is respectively 100 µm and 500 µm.

Figure 28:
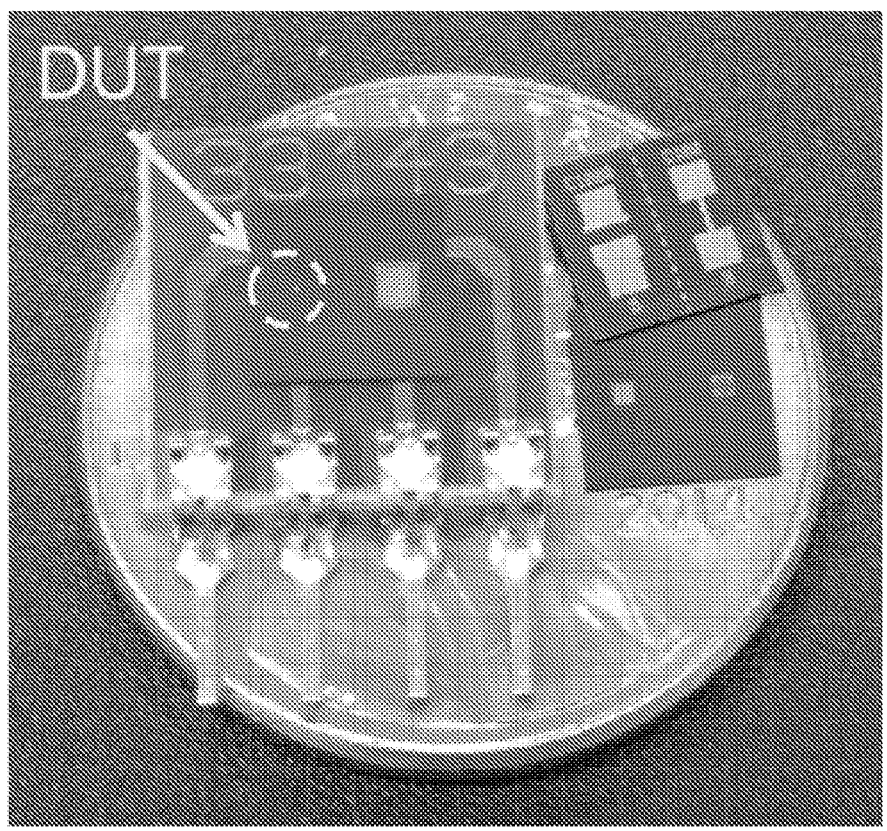
FIG. 28 is a photograph showing the capacitive sensor of FIG. 26 mounted to a device chip for testing.
Figure 29:
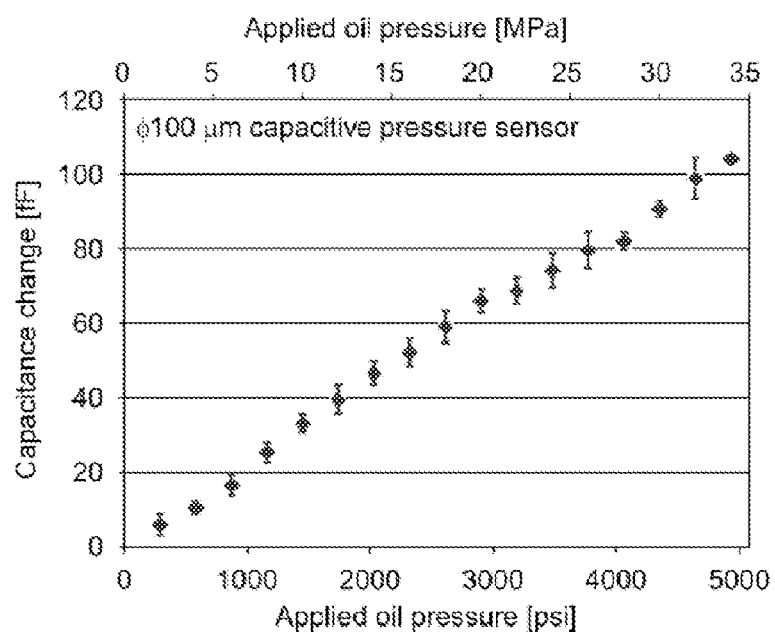
FIG. 29 is a plot of the test results from the sensor of FIG. 28.

Contact-mode capacitive pressure sensors fabricated with a diaphragm diameter of 100 µm and diaphragm thickness of 5 µm thick diaphragm (FIG. 26) have been tested in a dielectric oil environment. A device chip including the capacitive sensor (DUT) was mounted on a prototype board using conductive silver epoxy for testing and is shown in the photograph of FIG. 28. The prototype board was soldered to a 6-pin electrical connector and placed in a custom pressure chamber. Pressure was applied by a manual hydraulic pump capable of up to 60 MPa. The applied pressure was monitored by a pressure gauge between the pump and the pressure chamber. The connector was connected to a HP 4284A precision LCR meter to read capacitance. The LCR meter was calibrated at open state so that the measurements indicate change in capacitance with respect to pressure change. Pressure was increased from 0 to 34 MPa in 2 MPa increments, and the results are given in FIG. 29. Each data point in the plot of capacitance change versus applied oil pressure is based on an average of about 30 readings over three pressure cycles, and the error bars indicate one standard deviation. Capacitance changed by about 100 fF over the tested range of pressure, resulting in an average sensitivity of about 3.1 fF/MPa (21.1 fF/kpsi). The device is robust and remains operable after more than 10 pressure cycles.

FIG. 30 illustrates a system and process for implementing embodiments of the sensor in a subterranean environment. In this example, a plurality of sensor packages 300 is dispersed in a subterranean cavity 400, such as a well bore used in gas and oil exploration. The sensor packages 300 may be pumped or injected down into the cavity 400 with a liquid fluid to be distributed according to the fluid flow field. This is only one example. The sensor packages 300 may be distributed along with proppant in a hydraulic fracturing fluid, for example.

For use in the subterranean environment, embodiments of the above-described sensor may be packaged in the sensor packages 300, some examples of which are illustrated in FIGS. 31 and 32. Each sensor package 300 includes the sensor 10 sealed between a base 302 and a top 304 of a micropackage. In these examples, each sensor package also includes a battery or other power source 308 and layers of electronics 310 sealed between the base 302 and top 304 of each package with the sensor, along with electrical feedthroughs 312 formed through the base for communication between the inside of the micropackage and the external environment (e.g. chemical sensing or other electronics). In each case, the top 304 includes its own diaphragm portion 306 that interacts and/or forms part of the diaphragm of the sensor 10—i.e., when the diaphragm portion 306 deflects in response to pressure changes, the interelectrode spacing of the sensor 10 changes, and the distribution of electrical properties such as discharge current or capacitance changes as well.

Each top 304 in these examples can be formed from stainless steel or some other metal or durable material that can be sufficiently thinned to form the diaphragm portion 306, which must be flexible but strong and temperature resistant in the application of FIG. 30. Each base 302 in these examples can be formed from ceramic or some other durable insulating material. The base 302 could be formed from metal in embodiments in which the feedthroughs 312 are omitted or otherwise isolated from one another. Certain embodiments of the electronics 310 may benefit from at least a portion of the micropackage being formed from a non-metallic material to allow wireless communication to and from the sensor package 300, depending on the particular mode of wireless communication.

Each electronics unit 310 can be configured to perform a variety of different functions, such as control of voltage or voltage pulses from the battery 308 to the sensor 10, data processing, wireless communication, support for other types of sensors (e.g., temperature, sensor orientation, etc.), and data-logging, to name a few. Multiple layers of electronics can be stacked between the base 302 and top 304 in different configurations. In the example of FIG. 31, each layer of electronics 310 is different in length, providing access to each of the layers of the stack by an electrical connector for interconnection. In the example of FIG. 32, a flexible ribbon cable 316 is folded back and forth in a serpentine manner between layers for interconnection of the layers. Other sensor package configurations are possible, including sensors encased in rigid sphere-like shells for simultaneous protection, ease of flow in a fluid field, and sizing comparable to proppant materials. Also, use of reference numeral 10 for the sensor in FIGS. 31 and 32 is not intended to limit the sensor to any particularly illustrated embodiment of the sensor. Any of the illustrated embodiments disclosed herein, along with embodiments not specifically illustrated, may be so packaged and used in a subterranean environment.

It is to be understood that the foregoing description is of various embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," and "such as," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A sensor, comprising:
   a sensor body;
   a diaphragm supported in spaced apart relation to the sensor body and facing the sensor body across a gap; and
   a plurality of electrodes, each of which is attached to the sensor body or to the diaphragm at the gap and arranged such that, when the diaphragm deflects relative to the sensor body, the distance between a first pair of the electrodes changes, and the distance between a second pair of the electrodes does not change, wherein the first pair of electrodes includes a cathode on the sensor body and a sensing anode on the diaphragm, and the second pair of electrodes includes the cathode and a reference anode on the sensor body.

2. A sensor as defined in claim 1, further comprising a spacer located between the sensor body and the diaphragm and partly defining a sealed chamber having a perimeter that surrounds the plurality of electrodes.

3. A sensor as defined in claim 2, wherein the sealed chamber is a microdischarge chamber that contains a plasma when an ionizing voltage is applied across the pairs of electrodes.

4. A sensor as defined in claim 1, further comprising electrical contacts accessible at an exterior of the sensor and through-glass vias (TGVs) electrically connecting the electrical contacts with the plurality of electrodes through the thickness of the sensor body.

5. A sensor as defined in claim 1, further comprising electrical contacts accessible at an exterior of the sensor, wherein the sensor body comprises a doped semi-conductor layer electrically connecting the electrical contacts with the plurality of electrodes through the thickness of the sensor body.

6. A sensor as defined in claim 1 configured to be capable of operation in a micro discharge mode and in a capacitive mode.

7. A sensor as defined in claim 1, wherein the second pair of electrodes includes the cathode and the reference anode on the sensor body, the cathode having a plasma-concentrating feature that extends toward a plasma-concentrating feature of the reference anode to define a minimum gap between opposing edges of the cathode and the reference anode.

8. A method of determining fluid pressure in a subterranean cavity, comprising the step of receiving information related to the amount of deflection of a diaphragm of a sensor immersed in a fluid located in the subterranean cavity, the sensor comprising a plurality of electrodes arranged in a sealed chamber such that the distance between a first pair of the electrodes changes more than the distance between a second pair of the electrodes when the amount of deflection of the diaphragm changes, wherein said information indicates the distribution of an electrical property among the plurality of electrodes in response to a voltage applied to the plurality of electrodes, wherein both of the second pair of electrodes are positioned on a body of the sensor equal distances from the diaphragm, wherein the sensor is a microdischarge-based sensor and said information includes differential current, defined as the ratio of: the difference in the current flow between the two pairs of electrodes, to the sum of the current flow between the two pairs of electrodes.

9. The method of claim 8, wherein the step of receiving information includes receiving information related to the amount of deflection of each of a plurality of diaphragms of a corresponding plurality of sensors immersed in the fluid and dispersed in the subterranean cavity, each sensor comprising a plurality of electrodes arranged in a sealed chamber such that the distance between a first pair of electrodes of each sensor changes more than the distance between a second pair of electrodes of each sensor when the amount of deflection of each diaphragm changes, wherein said information indicates the distribution of an electrical property among the plurality of electrodes of each sensor in response to a voltage applied to the plurality of electrodes of each sensor.

10. A method of determining fluid pressure in a subterranean cavity, comprising the step of receiving information related to the amount of deflection of a diaphragm of a sensor immersed in a fluid located in the subterranean cavity, the sensor comprising a plurality of electrodes arranged in a sealed chamber such that the distance between a first pair of the electrodes changes more than the distance between a second pair of the electrodes when the amount of deflection of the diaphragm changes, wherein said information indicates the distribution of an electrical property among the plurality of electrodes in response to a voltage applied to the plurality of electrodes, wherein both of the second pair of electrodes are positioned on a body of the sensor equal distances from the diaphragm, wherein the sensor is a capacitive sensor and said information is based on a comparison of the capacitance between the first pair of electrodes and the capacitance between the second pair of electrodes.

11. A method of determining fluid pressure in a subterranean cavity, comprising the step of receiving information related to the amount of deflection of a diaphragm of a sensor immersed in a fluid located in the subterranean cavity, the sensor comprising a plurality of electrodes arranged in a sealed chamber such that the distance between a first pair of the electrodes changes more than the distance between a second pair of the electrodes when the amount of deflection of the diaphragm changes, wherein said information indicates the distribution of an electrical property among the plurality of electrodes in response to a voltage applied to the plurality of electrodes, wherein both of the second pair of electrodes are positioned on a body of the sensor equal distances from the diaphragm, wherein the first pair of electrodes includes a cathode on the sensor body and a sensing anode on the diaphragm, and the second pair of electrodes includes the cathode and a reference anode on the sensor body.

12. A method of determining fluid pressure in a subterranean cavity, comprising the step of receiving information related to the amount of deflection of a diaphragm of a sensor immersed in a fluid located in the subterranean cavity, the sensor comprising a plurality of electrodes arranged in a sealed chamber such that the distance between a first pair of the electrodes changes more than the distance between a second pair of the electrodes when the amount of deflection of the diaphragm changes, wherein said information indicates the distribution of an electrical property among the plurality of electrodes in response to a voltage applied to the plurality of electrodes, wherein both of the second pair of electrodes are positioned on a body of the sensor equal distances from the diaphragm, wherein the first pair of electrodes includes an anode on the sensor body and a sensing cathode on the diaphragm, and the second pair of electrodes includes the anode and a reference cathode on the sensor body.

13. A sensor, comprising:
a sensor body;
a diaphragm supported in spaced apart relation to the sensor body and facing the sensor body across a gap; and
a plurality of electrodes, each of which is attached to the sensor body or to the diaphragm at the gap and arranged such that, when the diaphragm deflects relative to the sensor body, the distance between a first pair of the electrodes changes, and the distance between a second pair of the electrodes does not change, wherein both of the second pair of electrodes are positioned on a body of the sensor equal distances from the diaphragm, wherein the first pair of electrodes includes an anode on the sensor body and a sensing cathode on the diaphragm, and the second pair of electrodes includes the anode and a reference cathode on the sensor body.

14. A sensor, comprising:

a sensor body;

a diaphragm supported in spaced apart relation to the sensor body and facing the sensor body across a gap; and a plurality of electrodes, each of which is attached to the sensor body or to the diaphragm at the gap and arranged such that, when the diaphragm deflects relative to the sensor body, the distance between a first pair of the electrodes changes, and the distance between a second pair of the electrodes does not change, wherein both of the second pair of electrodes are positioned on a body of the sensor equal distances from the diaphragm, wherein the sensor is a microdischarge-based sensor, wherein the sensor is configured to receive information related to an amount of deflection of the diaphragm of the sensor immersed in a fluid, and said information includes differential current, defined as the ratio of: the difference in the current flow between the two pairs of electrodes, to the sum of the current flow between the two pairs of electrodes.

15. A sensor, comprising:

a sensor body;

a diaphragm supported in spaced apart relation to the sensor body and facing the sensor body across a gap; and a plurality of electrodes, each of which is attached to the sensor body or to the diaphragm at the gap and arranged such that, when the diaphragm deflects relative to the sensor body, the distance between a first pair of the electrodes changes, and the distance between a second pair of the electrodes does not change, wherein both of the second pair of electrodes are positioned on a body of the sensor equal distances from the diaphragm, wherein the sensor is a capacitive sensor, wherein the sensor is configured to receive information related to an amount of deflection of the diaphragm of the sensor immersed in a fluid, and said information is based on a comparison of the capacitance between the first pair of electrodes and the capacitance between the second pair of electrodes.

* * * * *